United States Patent
Hosseini et al.

(10) Patent No.: US 11,558,152 B2
(45) Date of Patent: Jan. 17, 2023

(54) TRANSMISSION OF UPLINK CONTROL INFORMATION (UCI) BASED ON ONE OR MORE CODEBOOKS

(71) Applicant: QUALCOMM INCORPORATED, San Diego, CA (US)

(72) Inventors: Seyedkianoush Hosseini, San Diego, CA (US); Wei Yang, San Diego, CA (US); Enoch Shiao-Kuang Lu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 16/949,714

(22) Filed: Nov. 11, 2020

(65) Prior Publication Data

US 2021/0152293 A1 May 20, 2021

Related U.S. Application Data

(60) Provisional application No. 62/937,154, filed on Nov. 18, 2019.

(51) Int. Cl.
*H04W 72/04* (2009.01)
*H04L 1/18* (2006.01)
(Continued)

(52) U.S. Cl.
CPC ......... *H04L 1/1819* (2013.01); *H04B 7/0456* (2013.01); *H04B 7/0626* (2013.01);
(Continued)

(58) Field of Classification Search
CPC ... H04L 1/1819; H04L 1/1854; H04L 1/1896; H04L 1/1671; H04L 5/0055;
(Continued)

(56) References Cited

U.S. PATENT DOCUMENTS

2019/0261361 A1 8/2019 Gang et al.
2019/0349919 A1* 11/2019 Oh ................... H04L 1/0005
(Continued)

FOREIGN PATENT DOCUMENTS

WO 2018227164 A1 12/2018
WO 2019192007 A1 10/2019
WO WO-2021002292 A1 * 1/2021 ........... H04L 1/1671

OTHER PUBLICATIONS

Ericsson, R1-1908122, UCI Enhancements for NR URLLC, 3GPP TSG RAN WG1 Meeting #98, Aug. 26-30, 2019 (Year: 2019).*
(Continued)

*Primary Examiner* — Mahbubul Bar Chowdhury
(74) *Attorney, Agent, or Firm* — Haynes and Boone, LLP

(57) ABSTRACT

Wireless communication devices, systems, and methods related to communicating UCI are provided. For example, a method of wireless communication may include receiving, by a user equipment (UE) from a base station (BS), scheduling information for transmitting a hybrid automatic repeat request acknowledgement (HARQ-ACK) and uplink control information (UCI) during a time period. The UCI may include channel state information (CSI) or a scheduling request (SR). The method may include determining, by the UE, that the UCI and a HARQ-ACK codebook have a common priority, the HARQ-ACK being based on the HARQ-ACK codebook. The method may include transmitting, by the UE to the BS, the HARQ-ACK and the UCI during the time period based on the scheduling information, the transmitted UCI using resources determined based on a duration associated with the HARQ-ACK codebook, and the duration being based on the UCI and the HARQ-ACK codebook having the common priority.

24 Claims, 11 Drawing Sheets

(51) Int. Cl.
  *H04L 5/00* (2006.01)
  *H04B 7/0456* (2017.01)
  *H04W 72/12* (2009.01)
  *H04B 7/06* (2006.01)

(52) U.S. Cl.
  CPC ....... *H04L 5/0055* (2013.01); *H04W 72/0413* (2013.01); *H04W 72/0446* (2013.01); *H04W 72/1257* (2013.01); *H04W 72/1284* (2013.01)

(58) Field of Classification Search
  CPC ... H04L 5/0057; H04B 7/0456; H04B 7/0626; H04W 72/0413; H04W 72/0446; H04W 72/1257; H04W 72/1284
  See application file for complete search history.

(56) References Cited

U.S. PATENT DOCUMENTS

2020/0228248 A1* 7/2020 Islam ................... H04L 1/1861
2020/0329486 A1* 10/2020 Yang ......................... H04L 1/08
2020/0366417 A1* 11/2020 Lei ........................ H04L 1/1685

OTHER PUBLICATIONS

MediaTek Inc. R1-1908409, Multiple HARQ procedures and intra-UE UCI prioritization, 3GPP TSG RAN WG1 Meeting #98, Aug. 26-30, 2019 (Year: 2019).*

Huawei., et al., "Discussion on SR in Shortened TTI Scenario", 3GPP TSG RAN WG1 Meeting #90, 3GPP Draft; R1-1712127, 3rd Generation Partnership Project (3GPP), Mobile Competence Centre; 650, Route Des Lucioles; F-06921 Sophia-Antipolis Cedex; France vol. RAN WG1, No. Prague, Czech Republic; Aug. 21, 2017-Aug. 25, 2017, Aug. 20, 2017 (Aug. 20, 2017), 5 Pages, XP051314947, Retrieved from the Internet: URL: http://www.3gpp.org/ftp/Meetings_3GPP_SYNC/RAN1/Docs [retrieved on Aug. 20, 2017]Figure 1 Sections 2.2.1, 2.2.2.

International Search Report and Written Opinion—PCT/US2020/060074—ISA/EPO—dated Mar. 4, 2021.

* cited by examiner

TRANSMISSION OF UPLINK CONTROL INFORMATION (UCI) BASED ON ONE OR MORE CODEBOOKS

CROSS REFERENCE TO RELATED APPLICATIONS & PRIORITY CLAIM

The present application claims priority to and the benefit of U.S. Provisional Patent Application No. 62/937,154 filed Nov. 18, 2019, which is hereby incorporated by reference in its entirety as if fully set forth below and for all applicable purposes.

TECHNICAL FIELD

This application relates to wireless communication systems, and more particularly to methods (and associated devices and systems) for transmission of uplink control information (UCI) based on a codebook.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long-term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum.

The BS may schedule the UE for an uplink (UL) transmission. Based on the scheduling, the UE may transmit uplink control information (UCI) and/or UL data. Additionally, the BS may transmit data (DL) data to the UE. In turn, the UE may transmit feedback for the DL data to the BS. The feedback may be an acknowledgement (ACK) indicating that reception of the DL data by the UE is successful or may be a negative-acknowledgement (NACK) indicating that reception of the DL data by the UE is unsuccessful (e.g., including an error or failing an error correction).

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication includes receiving, by a user equipment (UE) from a base station (BS), first scheduling information for transmitting a first hybrid automatic repeat request acknowledgement (HARQ-ACK) and first uplink control information (UCI) during a time period, the first UCI including channel state information (CSI) or a scheduling request (SR); determining, by the UE, that the first UCI and a first HARQ-ACK codebook have a common priority, the first HARQ-ACK being based on the first HARQ-ACK codebook; and transmitting, by the UE to the BS, the first HARQ-ACK and the first UCI during the time period based on the first scheduling information, the transmitted first UCI using resources determined based on a duration associated with the first HARQ-ACK codebook, and the duration being based on the first UCI and the first HARQ-ACK codebook having the common priority.

In an aspect of the disclosure an apparatus includes a transceiver configured to: receive, by a user equipment (UE) from a base station (BS), first scheduling information for transmitting a first hybrid automatic repeat request acknowledgement (HARQ-ACK) and first uplink control information (UCI) during a time period, wherein the first UCI includes channel state information (CSI) or a scheduling request (SR); and transmit, by the UE to the BS, the first HARQ-ACK and the first UCI during the time period based on the first scheduling information, the transmitted first UCI using resources determined based on a duration associated with a first HARQ-ACK codebook, and the duration being based on the first UCI and the first HARQ-ACK codebook having a common priority; and a processor configured to: determine, by the UE, that the first UCI and the first HARQ-ACK codebook have the common priority, wherein the first HARQ-ACK is based on the first HARQ-ACK codebook.

In an aspect of the disclosure, a computer-readable medium having program code recorded thereon, the program code including: code for causing a user equipment (UE) to receive from a base station (BS), first scheduling information for transmitting a first hybrid automatic repeat request acknowledgement (HARQ-ACK) and first uplink control information (UCI) during a time period, the first UCI including channel state information (CSI) or a scheduling request (SR); code for causing the UE to determine that the first UCI and a first HARQ-ACK codebook have a common priority, the first HARQ-ACK being based on the first HARQ-ACK codebook; and code for causing the UE to transmit the first HARQ-ACK and the first UCI during the time period based on the first scheduling information, the transmitted first UCI using resources determined based on a duration associated with the first HARQ-ACK codebook, and the duration being based on the first UCI and the first HARQ-ACK codebook having the common priority.

In an aspect of the disclosure, an apparatus includes means for receiving from a base station (BS), first scheduling information for transmitting a first hybrid automatic repeat request acknowledgement (HARQ-ACK) and first uplink control information (UCI) during a time period, the first UCI including channel state information (CSI) or a scheduling request (SR); means for determining that the first UCI and a first HARQ-ACK codebook have a common priority, the first HARQ-ACK being based on the first HARQ-ACK codebook; and means for transmitting to the BS, the first HARQ-ACK and the first UCI during the time period based on the first scheduling information, the transmitted first UCI using resources determined based on a duration associated with the first HARQ-ACK codebook, and the duration being based on the first UCI and the first HARQ-ACK codebook having the common priority.

In an aspect of the disclosure, a method of wireless communication includes receiving, by a user equipment (UE) from a base station (BS), a first configuration for a first hybrid automatic repeat request acknowledgement (HARQ-ACK) codebook, the first configuration indicating that a duration associated with the first HARQ-ACK codebook is sub-slot-based; receiving, by the UE from the BS, first scheduling information for transmitting a set of HARQ-ACKs during a first time period and first uplink control information (UCI) during a second time period, the set of HARQ-ACKs being based on the first HARQ-ACK codebook, the set of HARQ-ACKs and the first UCI having a common priority, and the first UCI including channel state information (CSI) or a scheduling request (SR); and transmitting, by the UE to the BS, an uplink (UL) communication signal including the set of HARQ-ACKs multiplexed with the first UCI based on the first scheduling information when the first time period at least partially overlaps with the second time period.

In an aspect of the disclosure an apparatus includes a transceiver configured to: receive, by a user equipment (UE) from a base station (BS), a first configuration for a first hybrid automatic repeat request acknowledgement (HARQ-ACK) codebook, the first configuration indicating that a duration associated with the first HARQ-ACK codebook is sub-slot-based; receive, by the UE from the BS, first scheduling information for transmitting a set of HARQ-ACKs during a first time period and first uplink control information (UCI) during a second time period, the set of HARQ-ACKs being based on the first HARQ-ACK codebook, the set of HARQ-ACKs and the first UCI having a common priority, and the first UCI including channel state information (CSI) or a scheduling request (SR); and transmit, by the UE to the BS, an uplink (UL) communication signal including the set of HARQ-ACKs multiplexed with the first UCI based on the first scheduling information when the first time period at least partially overlaps with the second time period.

In an aspect of the disclosure, a computer-readable medium having program code recorded thereon, the program code including: code for causing a user equipment (UE) to receive from a base station (BS), a first configuration for a first hybrid automatic repeat request acknowledgement (HARQ-ACK) codebook, the first configuration indicating that a duration associated with the first HARQ-ACK codebook is sub-slot-based; code for causing the UE to receive from the BS, first scheduling information for transmitting a set of HARQ-ACKs during a first time period and first uplink control information (UCI) during a second time period, the set of HARQ-ACKs being based on the first HARQ-ACK codebook, the set of HARQ-ACKs and the first UCI having a common priority, and the first UCI including channel state information (CSI) or a scheduling request (SR); and code for causing the UE to transmit to the BS, an uplink (UL) communication signal including the set of HARQ-ACKs multiplexed with the first UCI based on the first scheduling information when the first time period at least partially overlaps with the second time period.

In an aspect of the disclosure, an apparatus includes means for receiving, by a user equipment (UE) from a base station (BS), a first configuration for a first hybrid automatic repeat request acknowledgement (HARQ-ACK) codebook, the first configuration indicating that a duration associated with the first HARQ-ACK codebook is sub-slot-based; means for receiving, by the UE from the BS, first scheduling information for transmitting a set of HARQ-ACKs during a first time period and first uplink control information (UCI) during a second time period, the set of HARQ-ACKs being based on the first HARQ-ACK codebook, the set of HARQ-ACKs and the first UCI having a common priority, and the first UCI including channel state information (CSI) or a scheduling request (SR); and means for transmitting, by the UE to the BS, an uplink (UL) communication signal including the set of HARQ-ACKs multiplexed with the first UCI based on the first scheduling information when the first time period at least partially overlaps with the second time period.

In an aspect of the disclosure, a method of wireless communication includes transmitting, by a base station (BS) to a user equipment (UE), first scheduling information for transmitting a first hybrid automatic repeat request acknowledgement (HARQ-ACK) and first uplink control information (UCI) during a time period, the first UCI including channel state information (CSI) or a scheduling request (SR), and the first HARQ-ACK and the first UCI having a common priority; and receiving, by the BS from the UE, the first HARQ-ACK and the first UCI based on the first scheduling information, the received first HARQ-ACK being based on a first HARQ-ACK codebook, and the received first UCI using resources based on a duration associated with the HARQ-ACK codebook.

In an aspect of the disclosure an apparatus includes a transceiver configured to: transmit, by a base station (BS) to a user equipment (UE), first scheduling information for transmitting a first hybrid automatic repeat request acknowledgement (HARQ-ACK) and first uplink control information (UCI) during a time period, the first UCI including channel state information (CSI) or a scheduling request (SR), and the first HARQ-ACK and the first UCI having a common priority; and receive, by the BS from the UE, the first HARQ-ACK and the first UCI based on the first scheduling information, the received first HARQ-ACK being based on a first HARQ-ACK codebook, and the received first UCI using resources based on a duration associated with the HARQ-ACK codebook.

In an aspect of the disclosure, a computer-readable medium having program code recorded thereon, the program code including: code for causing a base station (BS) to transmit to a user equipment (UE), first scheduling information for transmitting a first hybrid automatic repeat request acknowledgement (HARQ-ACK) and first uplink control information (UCI) during a time period, the first UCI including channel state information (CSI) or a scheduling request (SR), and the first HARQ-ACK and the first UCI having a common priority; and code for causing the BS to receive from the UE, the first HARQ-ACK and the first UCI based on the first scheduling information, the received first HARQ-ACK being based on a first HARQ-ACK codebook, and the received first UCI using resources based on a duration associated with the HARQ-ACK codebook.

In an aspect of the disclosure, an apparatus includes means for transmitting, by a base station (BS) to a user equipment (UE), first scheduling information for transmitting a first hybrid automatic repeat request acknowledgement (HARQ-ACK) and first uplink control information (UCI) during a time period, the first UCI including channel state information (CSI) or a scheduling request (SR), and the first HARQ-ACK and the first UCI having a common priority; and means for receiving, by the BS from the UE, the first HARQ-ACK and the first UCI based on the first scheduling information, the received first HARQ-ACK being based on a first HARQ-ACK codebook, and the received first UCI using resources based on a duration associated with the HARQ-ACK codebook.

In an aspect of the disclosure, a method of wireless communication includes transmitting, by a base station (BS) to a user equipment (UE), a first configuration for a first hybrid automatic repeat request acknowledgement (HARQ-ACK) codebook, the first configuration indicating that a duration associated with the first HARQ-ACK codebook is sub-slot-based; transmitting, by the BS to the UE, first scheduling information for transmitting a set of HARQ-ACKs during a first time period and first uplink control information (UCI) during a second time period, the set of HARQ-ACKs being based on the first HARQ-ACK codebook, the set of HARQ-ACKs and the first UCI having a common priority, and the first UCI including channel state information (CSI) or a scheduling request (SR); and receiving, by the BS from the UE, an uplink (UL) communication signal including the set of HARQ-ACKs multiplexed with the first UCI based on the first scheduling information when the first time period at least partially overlaps with the second time period.

In an aspect of the disclosure an apparatus includes a transceiver configured to: transmit, by a base station (BS) to a user equipment (UE), a first configuration for a first hybrid automatic repeat request acknowledgement (HARQ-ACK) codebook, the first configuration indicating that a duration associated with the first HARQ-ACK codebook is sub-slot-based; transmit, by the BS to the UE, first scheduling information for transmitting a set of HARQ-ACKs during a first time period and first uplink control information (UCI) during a second time period, the set of HARQ-ACKs being based on the first HARQ-ACK codebook, the set of HARQ-ACKs and the first UCI having a common priority, and the first UCI including channel state information (CSI) or a scheduling request (SR); and receive, by the BS from the UE, an uplink (UL) communication signal including the set of HARQ-ACKs multiplexed with the first UCI based on the first scheduling information when the first time period at least partially overlaps with the second time period.

In an aspect of the disclosure, a computer-readable medium having program code recorded thereon, the program code including: code for causing a base station (BS) to transmit to a user equipment (UE), a first configuration for a first hybrid automatic repeat request acknowledgement (HARQ-ACK) codebook, the first configuration indicating that a duration associated with the first HARQ-ACK codebook is sub-slot-based; code for causing the BS to transmit to the UE, first scheduling information for transmitting a set of HARQ-ACKs during a first time period and first uplink control information (UCI) during a second time period, the set of HARQ-ACKs being based on the first HARQ-ACK codebook, the set of HARQ-ACKs and the first UCI having a common priority, and the first UCI including channel state information (CSI) or a scheduling request (SR); and code for causing the BS to receive from the UE, an uplink (UL) communication signal including the set of HARQ-ACKs multiplexed with the first UCI based on the first scheduling information when the first time period at least partially overlaps with the second time period.

In an aspect of the disclosure, an apparatus includes means for transmitting to a user equipment (UE), a first configuration for a first hybrid automatic repeat request acknowledgement (HARQ-ACK) codebook, the first configuration indicating that a duration associated with the first HARQ-ACK codebook is sub-slot-based; means for transmitting to the UE, first scheduling information for transmitting a set of HARQ-ACKs during a first time period and first uplink control information (UCI) during a second time period, the set of HARQ-ACKs being based on the first HARQ-ACK codebook, the set of HARQ-ACKs and the first UCI having a common priority, and the first UCI including channel state information (CSI) or a scheduling request (SR); and means for receiving from the UE, an uplink (UL) communication signal including the set of HARQ-ACKs multiplexed with the first UCI based on the first scheduling information when the first time period at least partially overlaps with the second time period.

Other aspects, features, and advantages of the present disclosure will become apparent to those of ordinary skill in the art, upon reviewing the following description of specific, exemplary aspects of the present disclosure in conjunction with the accompanying figures. While features of the present disclosure may be discussed relative to certain examples and figures below, all aspects of the present disclosure can include one or more of the advantageous features discussed herein. In other words, while one or more embodiments may be discussed as having certain advantageous features, one or more of such features may also be used in accordance with the various other embodiments of the invention discussed herein. In similar fashion, while exemplary embodiments may be discussed below as device, system, or method embodiments, it should be understood that such exemplary embodiments can be implemented in various devices, systems, and methods.

DETAILED DESCRIPTION

Figure 1:
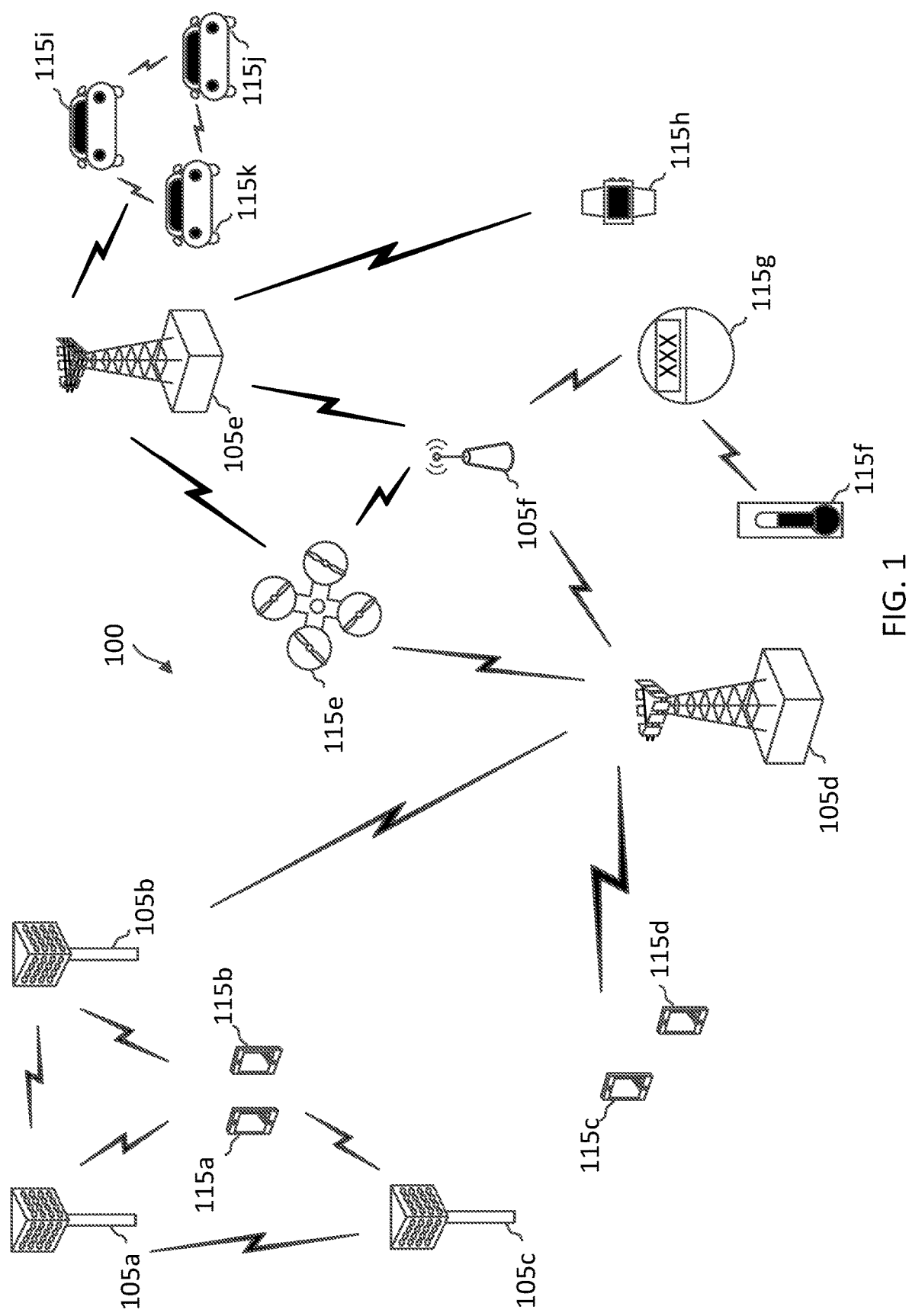
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an Ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing (SCS), may efficiently address operating diverse services across diverse spectrum and diverse deployments. For example, in various outdoor and macro coverage deployments of less than 3 GHz FDD/TDD implementations, SCS may occur with 15 kHz, for example over 5, 10, 20 MHz, and the like bandwidth (BW). For other various outdoor and small cell coverage deployments of TDD greater than 3 GHz, SCS may occur with 30 kHz over 80/100 MHz BW. For other various indoor wideband implementations, using a TDD over the unlicensed portion of the 5 GHz band, the SCS may occur with 60 kHz over a 160 MHz BW. Finally, for various deployments transmitting with mmWave components at a TDD of 28 GHz, the SCS may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects or examples set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

The present disclosure provides techniques for the BS and/or the UE to communicate HARQ-ACK and CSI/SR based on one or more HARQ-ACK codebooks. A BS may transmit DL data to the UE. In turn, the UE may transmit feedback for the DL data to the BS. The feedback may be a hybrid automatic repeat request acknowledgement (HARQ-ACK). The feedback may be an acknowledgement (ACK) indicating that reception of the DL data by the UE is successful or may be a negative-acknowledgement (NACK) indicating that reception of the DL data by the UE is unsuccessful (e.g., including an error or failing an error correction).

Additionally, the BS 105 may configure the UE 115 with a HARQ-ACK codebook 210 corresponding to a plurality of HARQ-ACK bits. The plurality of HARQ-ACK bits may be grouped into one HARQ-ACK transmission (e.g., HARQ-ACK 228). A duration associated with a HARQ-ACK codebook may be slot-based or sub-slot-based. The BS 105 may transmit a configuration for the HARQ-ACK codebook 210 to the UE 115, the configuration indicating whether a duration associated with the HARQ-ACK codebook is slot-based or sub-slot-based. Additionally, the BS 105 may transmit an indication of a priority of the HARQ-ACK codebook 210. For example, the HARQ-ACK codebook 210 may correspond to a high priority. In another example, the HARQ-ACK codebook 210 may correspond to a low priority. A HARQ-ACK may be based on the HARQ-ACK codebook.

Additionally, the UE may transmit uplink control information (UCI) to the BS, where the UCI may include channel state information (CSI) or a scheduling request (SR). The UE may transmit the HARQ-ACK and the CSI/SR to the BS. The UE may transmit the CSI/SR using resources determined based on a duration associated with the HARQ-ACK codebook. Additionally, the duration may be based on the CSI/SR and the HARQ-ACK codebook having the common priority. For example, if the UE is configured with a low priority HARQ-ACK codebook, then the PUCCH resources for transmitting CSI/SR may have the same slot duration as the low priority HARQ-ACK codebook (e.g., slot-based or sub-slot-based). If the low priority HARQ-ACK codebook is configured with a slot-based transmission, then the PUCCH resource used to transmit the CSR/SR may also be a slot-based transmission. If the low priority HARQ-ACK codebook is configured with a sub-slot-based transmission, then the PUCCH resource used to transmit the CSR/SR may also be a sub-slot-based transmission.

These and other aspects of the present disclosure can provide several benefits. For example, a sub-slot-based HARQ-ACK codebook may provide for a lower latency than a full slot-based HARQ-ACK codebook because the UE is able to transmit CSI/SR or the HARQ-ACK at the sub-slot boundary rather than wait until the next full slot. Additionally, the UE may transmit two transmissions in one slot (e.g., one per sub-slot in the slot), further reducing the latency compared to transmissions that are slot-based. Additional features and benefits of the present disclosure are set forth in the following description.

FIG. 1 illustrates a wireless communication network 100 according to some aspects of the present disclosure. The network 100 may be a 5G network. The network 100 includes a number of base stations (BSs) 105 (individually labeled as 105*a*, 105*b*, 105*c*, 105*d*, 105*e*, and 105*f*) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a hand-held device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V) communications among the UEs 115i-115k, vehicle-to-everything (V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the SCS between adjacent subcarriers may be fixed, and the total number of subcarriers (K) may be dependent on the system BW. The system BW may also be partitioned into subbands. In other instances, the SCS and/or the duration of TTIs may be scalable.

In some aspects, the BSs 105 can assign or schedule transmission resources (e.g., in the form of time-frequency resource blocks (RB)) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots of sub-slots. In a FDD mode, simultaneous UL and DL transmissions may occur in different frequency bands. For example, each subframe includes an UL subframe in an UL frequency band and a DL subframe in a DL frequency band. A subframe may also be referred to as a slot. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. An UL-centric subframe may include a longer duration for UL communication than for DL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB, which may be transmitted in the physical broadcast channel (PBCH). The MIB may include system information for initial network access and scheduling information for RMSI and/or OSI. After decoding the MIB, the UE 115 may receive RMSI, OSI, and/or one or more system information blocks (SIBs). The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit an UL communication signal to the BS 105 via a PUSCH and/or PUCCH according to an UL scheduling grant. In some aspects, the BS 105 may communicate with a UE 115 using HARQ techniques to improve communication reliability, for example, to provide a URLLC service.

Figure 2:
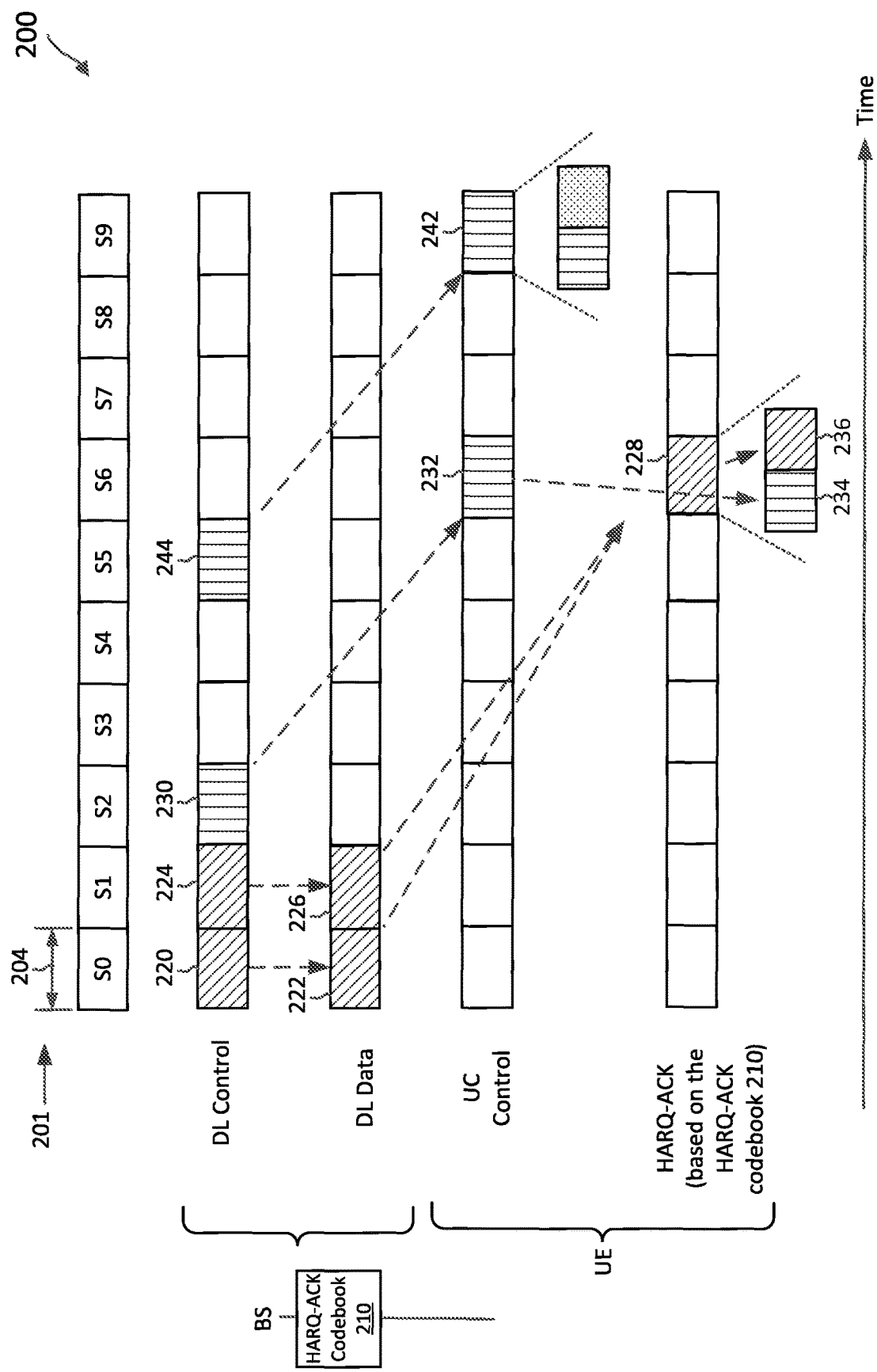
FIG. 2 illustrates a scheduling timeline according to one or more aspects of the present disclosure.

FIG. 2 illustrates a scheduling timeline 200 according to one or more aspects of the present disclosure. The scheduling timeline 200 may correspond to a scheduling timeline communicated between a BS 105 and a UE 115 of the network 100. In FIG. 2, the x-axis represents time in some constant units. FIG. 2 shows a frame structure 201 including a plurality of slots 204 in time. The slots 204 are indexed from S0 to S9. For example, a BS may communicate with a UE in units of slots 204. The slots 204 may also be referred to as transmission time intervals (TTIs). Each slot 204 or TTI carries a medium access control (MAC) layer transport block. Each slot 204 may include a number of symbols in time and a number of frequency tones in frequency. Each slot 204 may include a DL control portion followed by at least one of a subsequent DL data portion, UL data portion, and/or a UL control portion. In the context of LTE, the DL control portion, the DL data portion, the UL data portion, and the UL control portion may be referred to as a physical downlink control channel (PDCCH), a physical downlink shared channel (PDSCH), a physical uplink shared channel (PUSCH), and a physical uplink control channel (PUCCH), respectively.

While an entire slot 204 is pattern-filled, a transmission may occur only in a corresponding portion of the slot 204. The pattern-filled boxes represent transmissions of DL control information, DL data, UL data, an acknowledgment (ACK), and/or a negative-acknowledgement (NACK) in corresponding slots 204. The ACK/NACK may be associated with a hybrid automatic repeat request (HARQ) process. In a HARQ process, a transmitting node may transmit various coded versions of information data to a receiving node. For example, the transmitting node may transmit a first coded version of information data to the receiving node. Upon receiving an NACK signal from the receiving node, the transmitting node may transmit a second coded version of the information data to the receiving node. The receiving node may combine the received first coded version and the received second coded version for error correction when both the received first coded version and the received second coded version are erroneous.

The BS 105 may configure the UE 115 with a HARQ-ACK codebook 210 corresponding to a plurality of HARQ-ACK bits. The plurality of HARQ-ACK bits may be grouped into one HARQ-ACK transmission (e.g., HARQ-ACK 228). A duration associated with a HARQ-ACK codebook may be slot-based or sub-slot-based. The BS 105 may transmit a configuration for the HARQ-ACK codebook 210 to the UE 115, the configuration indicating whether a duration associated with the HARQ-ACK codebook is slot-based or sub-slot-based. Additionally, the BS 105 may transmit an indication of a priority of the HARQ-ACK codebook 210. For example, the HARQ-ACK codebook 210 may correspond to a high priority. In another example, the HARQ-ACK codebook 210 may correspond to a low priority. In some instances, the UE is configured with a sub-slot-based HARQ-ACK codebook via an RRC parameter (e.g., "subslotLength-ForPUCCH") for a HARQ-ACK codebook of a corresponding priority.

The BS may transmit scheduling information for the UE 115 to transmit UCI. The UCI may include HARQ-ACK, channel state information (CSI) and/or a scheduling request (SR). The UE 115 may transmit scheduling information for transmitting a HARQ-ACK and non-HARQ-ACK UCI (e.g., CSI and/or SR) during a time period (e.g., in a slot indexed 204 indexed S6). The present disclosure may use the term UCI or first UCI to refer to non-HARQ-ACK UCI such as CSI or SR.

As shown, the BS 105 transmits DL control information (DCI) 220 in the slot 204 indexed S0 (e.g., in a DL control portion of the slot 204). The DCI 220 may indicate a DL grant for the UE 115 in the same slot 204 indexed S0. Thus, the BS 105 transmits a DL data signal 222 to the UE 115 in the slot 204 indexed S0 (e.g., in a DL data portion of the slot 204). The UE 115 may receive the DCI 220, decode the DCI 220, and receive the DL data signal 222 based on the DL grant. Additionally, the BS transmits DCI 224 in the slot 204 indexed S1 (e.g., in a DL control portion of the slot 204). The DCI 224 may indicate a DL grant for the UE in the same slot 204 indexed S1. Thus, the BS transmits a DL data signal 226 to the UE in the slot 204 indexed S1 (e.g., in a DL data portion of the slot 204). The UE may receive the DCI 224, decode the DCI 224, and receive the DL data signal 226 based on the DL grant.

The UE 115 may report a reception status of a DL data signal to the BS 105 by transmitting a HARQ-ACK. The HARQ-ACK may refer to a feedback signal carrying an ACK or a NACK. The UE may transmit an ACK when reception of the DL data by the UE is successful or may transmit a NACK when reception of the DL data by the UE is unsuccessful (e.g., an error or failing an error correction). The BS may transmit (e.g., in the DCI 220 and/or the DCI 224) an indication to the UE that the HARQ-ACK for the DL data signals 222 and 224 is based on the first codebook 210. The UE 115 may report, based on the indication, a reception status of the DL data signals 222 and 224 to the BS 105 by transmitting a HARQ-ACK 228 in the slot 204 indexed S6 (e.g., in a UL control portion of the slot 204). The slot 204 indexed S6 is a sixth slot from the slot 204 indexed S0 and a fifth slot from the slot 204 indexed S1. The HARQ-ACK 228 may indicate a first HARQ-ACK bit corresponding to feedback for the DL data signal 222 and a second HARQ-ACK bit corresponding to feedback for the DL data signal 226. The HARQ-ACK 228 is based on the HARQ-ACK codebook 210. For instance, the HARQ-ACK 228 includes an ACK/NACK sequence selected from the HARQ-ACK codebook 210 representing the first HARQ-ACK bit and the second HARQ-ACK bit.

The BS 105 further transmits DCI 230 in the slot 204 indexed S2 (e.g., in a DL control portion of the slot 204). The DCI 230 may indicate a UL grant for the UE 115. The UE 115 transmits UL control information (UCI) 232 to the BS 105 in the slot 204 indexed S6 (e.g., in a UL data portion of the slot 204) based on the UL assignment. The UCI 232 may include, for example, CSI or a SR. The slot 204 indexed S6 is a fourth slot from the slot 204 indexed S2. The BS 105 may transmit an indication of a priority of the HARQ-ACK codebook 210. For example, the BS 105 may transmit the indication of the priority dynamically via the scheduling DCI that schedules the reception of DL data (e.g., DCI 220 and DCI 224). Additionally, the BS 105 may transmit in the DCI 220 and 224 scheduling information for transmitting the HARQ-ACK 228 and may transmit in the DCI 230 scheduling information for transmitting the UCI 232.

The UE 115 may receive the scheduling information and transmit to the BS, the HARQ-ACK 228 and the UCI 232 in the slot indexed S6 based on the scheduling information. If the transmission of the UCI 232 collides with the transmission of the HARQ-ACK 228, the UE 115 may transmit a UL communication signal including the HARQ-ACK 228 multiplexed with the UCI 232. The UE 115 may transmit the multiplexed payload in one PUCCH transmission. If the transmission of the UCI 232 does not collide with the transmission of the HARQ-ACK 228, the UE 115 may transmit both the UCI 232 and the HARQ-ACK 228 in the same slot 204 indexed S6 as two separate transmissions under certain conditions.

In some aspects, the BS 105 does not transmit an indication to the UE whether a PUCCH resource is slot-based or sub-slot-based. In some aspects, the UE 115 may determine, based on a duration associated with the HARQ-ACK codebook 210, resources (e.g., PUCCH resources) for transmitting the UCI (e.g., UCI 232). A PUCCH resource carrying CSI or a SR may be configured with the same slot duration as the HARQ-ACK codebook 210.

The UE 115 may determine whether the UCI 232 and the HARQ-ACK codebook 210 have a common or same priority (e.g., high priority or low priority). The UE 115 may determine that PUCCH carrying the UCI 232 has the same slot configuration (e.g., slot-based or sub-slot-based) as the HARQ-ACK codebook 210 in response to a determination that the UCI 232 and the HARQ-ACK codebook 210 have a common priority.

In some aspects, the HARQ-ACK codebook 210 is configured with a slot-based transmission. Accordingly, the duration associated with the HARQ-ACK codebook 210 is a full slot. If the UCI 232 and the HARQ-ACK codebook 210 have a common priority, the UE 115 may determine that PUCCH carrying the UCI 232 is slot-based in response to a determination that the HARQ-ACK codebook 210 is configured with a slot-based transmission. If the HARQ-ACK codebook 210 is configured with a slot-based transmission, the UE 115 may transmit in each slot a HARQ-ACK if the periodicity of the HARQ-ACK is one (e.g., one HARQ-ACK per slot).

In some aspects, the HARQ-ACK codebook 210 is configured with a sub-slot-based transmission. Accordingly, the duration associated with the HARQ-ACK codebook 210 is a sub-slot. If the UCI 232 and the HARQ-ACK codebook 210 have a common priority, the UE 115 may determine that PUCCH carrying the UCI 232 is sub-slot-based in response to a determination that the HARQ-ACK codebook 210 is configured with a sub-slot-based transmission. Sub-slot boundaries may be defined for constructing the HARQ-ACK codebook 210. The sub-slot-based PUCCH resources may be limited to the defined sub-slots of the slot. For example, any sub-slot PUCCH resource does not span across sub-slot boundaries. If the HARQ-ACK codebook 210 is configured with a sub-slot-based transmission, the UE 115 may transmit in each sub-slot a HARQ-ACK if the periodicity of the HARQ-ACK is one (e.g., one HARQ-ACK per sub-slot).

A benefit of providing a sub-slot-based HARQ-ACK codebook may provide for a lower latency than a full slot-based HARQ-ACK codebook because the UE 115 is able to transmit at the sub-slot boundary rather than wait until the next full slot. Additionally, the UE 115 may transmit two transmissions in one slot, further reducing the latency compared to transmissions that are slot-based.

In the example illustrated in FIG. 2, the HARQ-ACK codebook 210 is configured with a sub-slot-based transmission. The BS and/or the UE 115 may partition the slot 204 indexed S6 into sub-slots 234 and 236. The UE 115 may transmit the first UCI 232 in the sub-slot 234 and may transmit the HARQ-ACK 228 in the sub-slot 236. The UE 115 may determine whether the HARQ-ACK 228 and the UCI 232 have a common priority. Based on the HARQ-ACK codebook 210 being sub-slot-based and the HARQ-ACK 228 and the UCI 232 having a common priority, the UE 115 may transmit other UCI (e.g., UCI 242) in a sub-slot-based PUCCH resource. For example, the UE 115 may transmit other UCI 242 (different from the UCI 232) in a first sub-slot of the slot 204 indexed S9 and may transmit another UCI (e.g., a HARQ-ACK different from the HARQ-ACK 228) in a second sub-slot of the slot 204 indexed S9. The transmission of the UCI 242 may be based on a UL grant indicated in a DCI 244.

Figure 3:
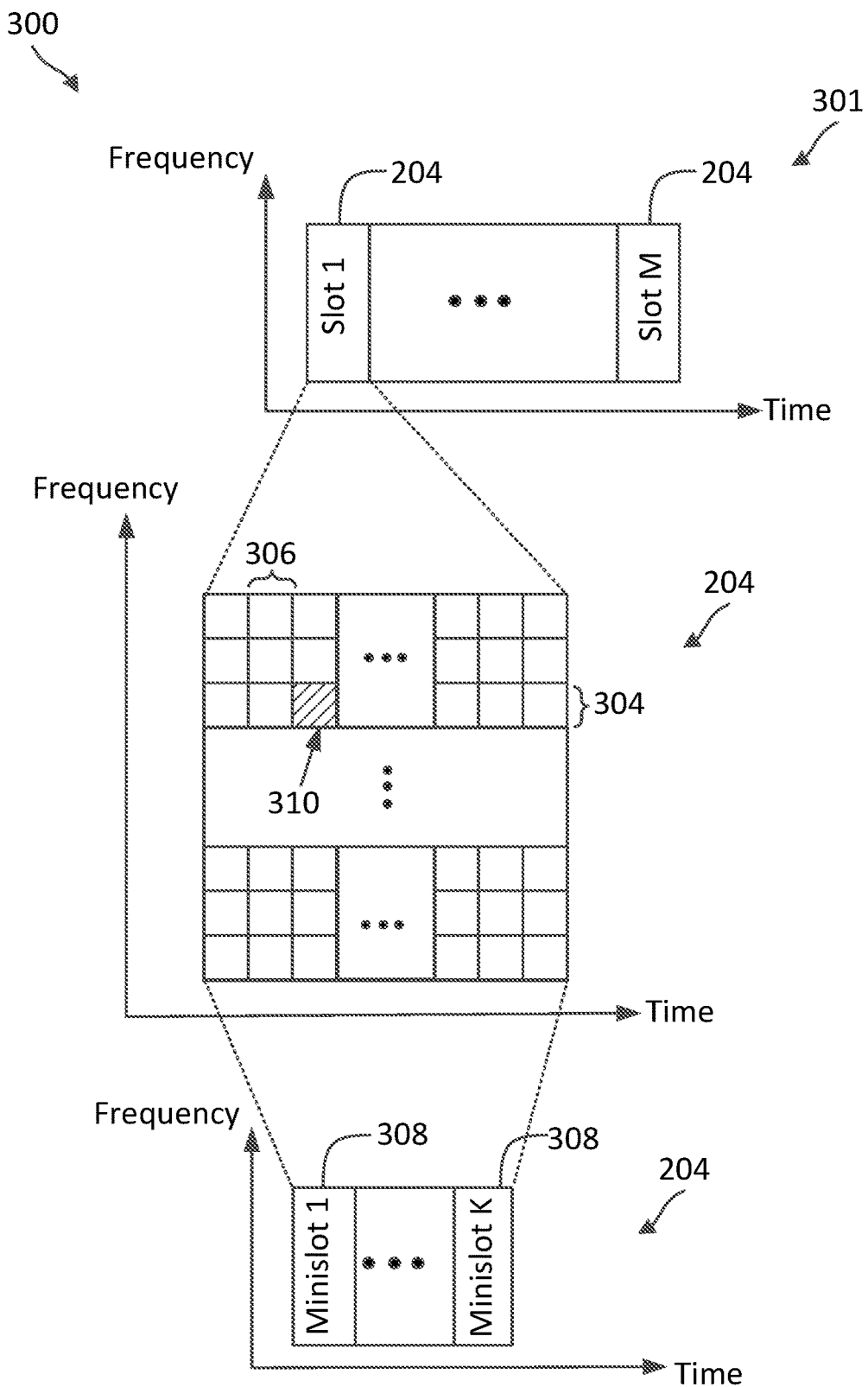
FIG. 3 is a timing diagram illustrating a transmission frame structure according to one or more aspects of the present disclosure.

FIG. 3 is a timing diagram illustrating a transmission frame structure 300 according to one or more aspects of the present disclosure. The transmission frame structure 300 may be employed by BSs such as the BSs 105 and UEs such as the UEs 115 in a network such as the network 100 for communications. In particular, the BS may communicate with the UE using time-frequency resources configured as shown in the transmission frame structure 300. In FIG. 3, the x-axes represent time in some arbitrary units and the y-axes represent frequency in some arbitrary units. The transmission frame structure 300 includes a radio frame 301. The duration of the radio frame 301 may vary depending on the embodiments. In an example, the radio frame 301 may have a duration of about ten milliseconds. The radio frame 301 includes M number of slots 204, where M may be any suitable positive integer. In an example, M may be about 10.

Each slot 204 includes a number of subcarriers 304 in frequency and a number of symbols 306 in time. The number of subcarriers 304 and/or the number of symbols 306 in a slot 204 may vary depending on the embodiments, for example, based on the channel bandwidth, the subcarrier spacing (SCS), and/or the CP mode. One subcarrier 304 in frequency and one symbol 306 in time forms one resource element (RE) 310 for transmission.

A BS (e.g., BS 105 in FIG. 1) may schedule a UE (e.g., UE 115 in FIG. 1) for UL and/or DL communications at a time-granularity of slots 204 or sub-slots 308. Each slot 204 may be time-partitioned into K number of sub-slots 308. Each sub-slot 308 may include one or more symbols 306. The sub-slots 308 in a slot 204 may have variable lengths. For example, when a slot 204 includes N number of symbols 306, a sub-slot 308 may have a length between one symbol 306 and (N−1) symbols 306. In some aspects, a sub-slot 308 may have a length of about two symbols 306, about four symbols 306, or about seven symbols 306. The BS may configure certain time-frequency resources (e.g., a set of REs 310) within a slot 204 for DL control channel monitoring and the resources may be repeated at some intervals as described in greater detail herein.

Figure 4:
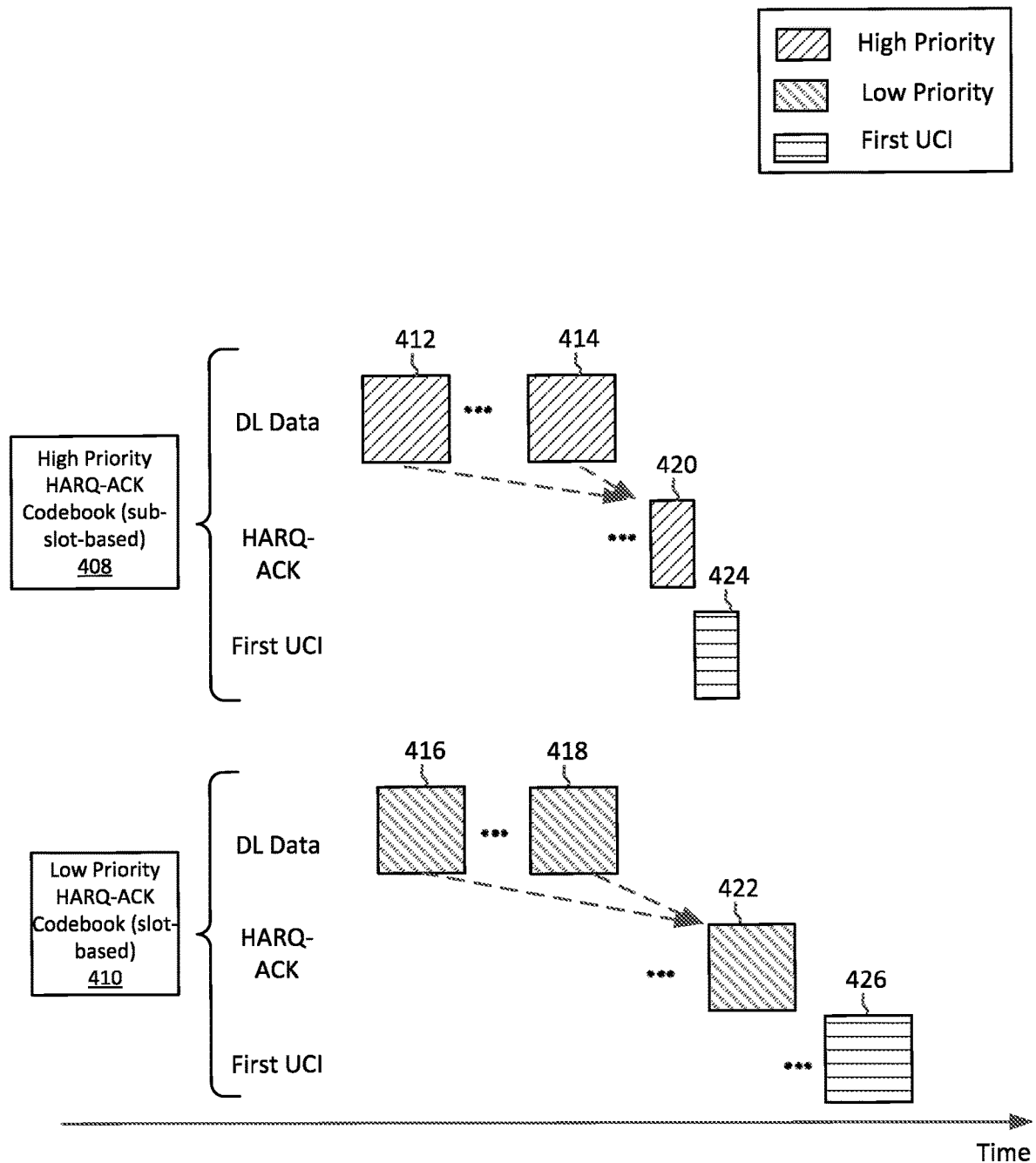
FIG. 4 illustrates a communication scheme in which a user equipment (UE) supports multiple hybrid automatic repeat request acknowledgement (HARQ-ACK) codebooks according to one or more aspects of the present disclosure.

In some aspects, the BS 105 may configure the UE 115 to support two different HARQ-ACK codebooks. FIG. 4 illustrates a communication scheme 400 in which the UE supports multiple HARQ-ACK codebooks according to one or more aspects of the present disclosure. The communication scheme 400 may be employed by UEs such as the UEs 115 and BSs such as the BSs 105 in a network such as the network 100.

In communication scheme 400, the BS 105 may configure the UE 115 to support a high priority HARQ-ACK codebook 408 and a low priority HARQ-ACK codebook 410. The BS 105 may transmit a first configuration for the HARQ-ACK codebook 408, the first configuration indicating that the HARQ-ACK codebook 408 corresponds to a high priority and that the HARQ-ACK codebook 408 is sub-slot-based. The first configuration may directly configure the priority of the HARQ-ACK codebook 408. If a HARQ-ACK codebook corresponds to a high priority, a HARQ-ACK that is based on the HARQ-ACK codebook has a high priority. Additionally, the BS 105 may transmit a second configuration for the HARQ-ACK codebook 410, the second configuration indicating that the HARQ-ACK codebook 410 corresponds to a low priority and that the HARQ-ACK codebook 410 is slot-based. The second configuration may directly configure the priority of the HARQ-ACK codebook 410. If a HARQ-ACK codebook corresponds to a low priority, a HARQ-ACK that is based on the HARQ-ACK codebook has a low priority. Accordingly, the UE 115 may maintain two different HARQ-ACK codebooks and may transmit HARQ-ACK bits based on any one of the two HARQ-ACK codebooks.

The BS 105 may schedule the UE 115 for reception of DL data 412, 414, 416, and 418. Each of the DL data 412, 414, 416, and 418 may correspond to a HARQ-ACK bit that provides feedback on the respective DL data. The BS 105 may transmit an indication that the HARQ-ACK bit for the DL data 412 and the HARQ-ACK bit for the DL data 414 belong to the high priority HARQ-ACK codebook 408 and may also transmit an indication that the HARQ-ACK bit for the DL data 416 and the HARQ-ACK bit for the DL data 418 belong to the low priority HARQ-ACK codebook 410. In response to these indications, the UE 115 may generate and transmit two HARQ-ACK transmissions 420 and 422, where the HARQ-ACK transmission 420 indicates at least two HARQ-ACK bits and the HARQ-ACK transmission 422 indicates at least two HARQ-ACK bits. The HARQ-ACK transmission 420 includes HARQ-ACK bits corresponding to the DL data 412 and the DL data 414, and the HARQ-ACK transmission 422 indicates HARQ-ACK bits corresponding to the DL data 416 and 418.

Additionally, the BS 105 may schedule the UE 115 for transmission of first UCI, which may include CSI or a SR. The CSI may include a CSI-part 1 and a CSI-part 2. The CSI-part 1 can include information related to wideband channel quality indicator (CQI), subband differential CQI, and/or precoding matrix indicator (PMI), determined based on a reference signal (e.g., a CSI-RS) in a DL communication. The CSI-part 2 can include information related to CSI-RS resource indicator (CRI), rank indicator (RI), layer indicator (LI), determined based on a reference signal (e.g., a CSI-RS) in a DL communication. Additionally, the SR may trigger the BS 105 to provide the UE 115 with a UL scheduling grant.

The BS 105 may configure the priority of the SR through RRC configuration, and the priority of CSI is always associated with a low priority. The BS 105 may transmit an indication of the priority of the HARQ-ACK codebook. For example, the BS may transmit the indication dynamically via a scheduling DCI that schedules reception of the DL data (e.g., DCI 220 or DCI 224 in FIG. 2). The UE 115 may determine whether the HARQ-ACK 420 and the first UCI 424 correspond to a common priority. The UE 115 may determine that resources (e.g., PUCCH resources) used for transmitting the first UCI 424 may have the same duration as the duration associated with the high priority HARQ-ACK codebook 408 in response to a determination that the HARQ-ACK 420 and the first UCI 424 correspond to a common priority. In another example, if the UE 115 receives an indication that a low priority HARQ-ACK codebook is sub-slot-based, then the UE 115 may determine that the PUCCH carrying CSI, which is associated with a low priority, is also sub-slot-based. In some instances, the UE is configured with a sub-slot-based HARQ-ACK codebook by an RRC parameter (e.g., "subslotLength-ForPUCCH") for the corresponding HARQ-ACK codebook of a corresponding priority. If the UE 115 receives a configuration for a PUCCH resource, the UE 115 may determine that each of the PUCCH resources will be confined within the sub-slot.

The UE 115 may determine that resources (e.g., PUCCH resources) used for transmitting the first UCI 424 may have the same duration as the duration associated with the high priority HARQ-ACK codebook 408 in response to a determination that the HARQ-ACK 420 and the first UCI 424 correspond to a common priority. The first UCI 424 may be, for example, a SR. Accordingly, the UE 115 may determine, based on the high priority HARQ-ACK codebook 408 being sub-slot-based and the HARQ-ACK 420 and the first UCI 424 corresponding to a common priority, that transmission of the first UCI 424 is also sub-slot-based. The UE 115 may partition a slot into a first sub-slot and a second sub-slot and may transmit the HARQ-ACK 420 in the first sub-slot and may transmit the first UCI 424 in the second sub-slot.

Additionally, the UE 115 may determine that resources (e.g., PUCCH resources) used for transmitting the first UCI 426 may have the same duration as the duration associated with the low priority HARQ-ACK codebook 410 in response to a determination that the HARQ-ACK 420 and the first UCI 424 correspond to a common priority. The first UCI 426 may be CSI or a SR. Accordingly, the UE 115 may determine, based on the low priority HARQ-ACK codebook 410 being slot-based and the HARQ-ACK 420 and the first UCI 424 corresponding to a common priority, that transmission of the first UCI 426 is also slot-based.

It should be understood that the descriptions provided in the present disclosure are examples, and in other aspects, a HARQ-ACK codebook may be a high priority codebook that is slot-based and a HARQ-ACK codebook may be a low priority codebook that is sub-slot-based. Accordingly, the UE 115 may determine, based on the high priority HARQ-ACK codebook being slot-based and the HARQ-ACK and the first UCI corresponding to a common priority, that transmission of the high priority first UCI (e.g., a SR) is also slot-based. Additionally, the UE 115 may determine, based on the low priority HARQ-ACK codebook being sub-slot-based and the HARQ-ACK and the first UCI corresponding to a common priority, that transmission of the low priority first UCI (e.g., CSI or a SR) is also sub-slot-based. In some aspects, the high priority HARQ-ACK codebook and the low priority HARQ-ACK codebook may correspond to the same duration (e.g., may both be slot-based or may both be sub-slot-based). For example, the UE 115 may determine, based on the high priority HARQ-ACK codebook and the low HARQ-ACK codebook being slot-based and the HARQ-ACK and the first UCI corresponding to a common priority, that transmission of the first UCI (e.g., CSI or SR) is also slot-based. In another example, the UE 115 may determine, based on the high priority HARQ-ACK codebook and the low HARQ-ACK codebook being sub-slot-based and the HARQ-ACK and the first UCI corresponding to a common priority, that transmission of the first UCI (e.g., CSI or SR) is also sub-slot-based.

Figure 5:
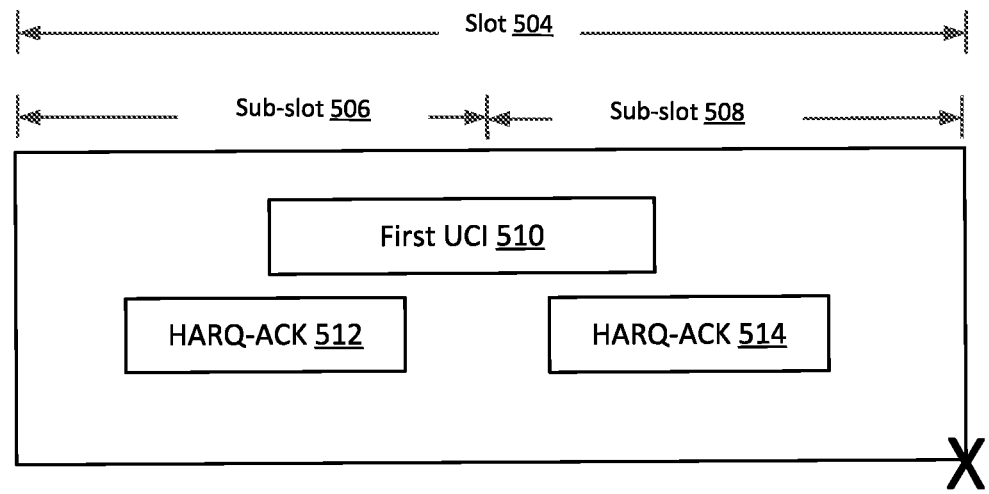
FIG. 5 illustrates a communication scheme in which two uplink (UL) transmissions collide according to one or more aspects of the present disclosure.

If a duration associated with a HARQ-ACK codebook is sub-slot-based and a PUCCH resource carrying first UCI (e.g., CSI or SR) is slot-based, it may be difficult for the UE 115 to multiplex the HARQ-ACK with the PUCCH carrying the first UCI. Additionally, it may be desirable for the BS 105 to not schedule PUCCH transmissions that may collide with each other. PUCCH transmissions may collide with each other if the transmissions overlap in time. For example, in FIG. 5, two UL transmissions may collide. In FIG. 5, a slot 504 may be partitioned into a sub-slot 506 and a sub-slot 508. Each of the sub-slots 506 and 508 may include, for example, seven symbols. The HARQ-ACK transmissions may be sub-slot-based, and the first UCI transmission may be slot-based. A PUCCH carrying HARQ-ACK 512 may use resources in the sub-slot 506, a PUCCH carrying HARQ-ACK 514 may use resources in the sub-slot 508, and a PUCCH carrying the first UCI 510 may use resources in the slot 504. The first UCI 510 may include, for example, CSI or SR. The transmission of the first UCI 510 spans the two sub-slots 506 and 508, with the sub-slot 506 containing the transmission of the HARQ-ACK 512 and the sub-slot 508 containing the transmission of the HARQ-ACK 514. The UE 115 may determine whether transmission of the first UCI 510 collides with transmissions of the first HARQ-ACK 512 and the second HARQ-ACK 514. The UE 115 may transmit an error event in response to a determination that transmission of the first UCI 510 collides with transmissions of the first and second HARQ-ACKs 512 and 514. As indicated by the "X" in FIG. 5, such a transmission is an undesirable scenario.

Figure 6:
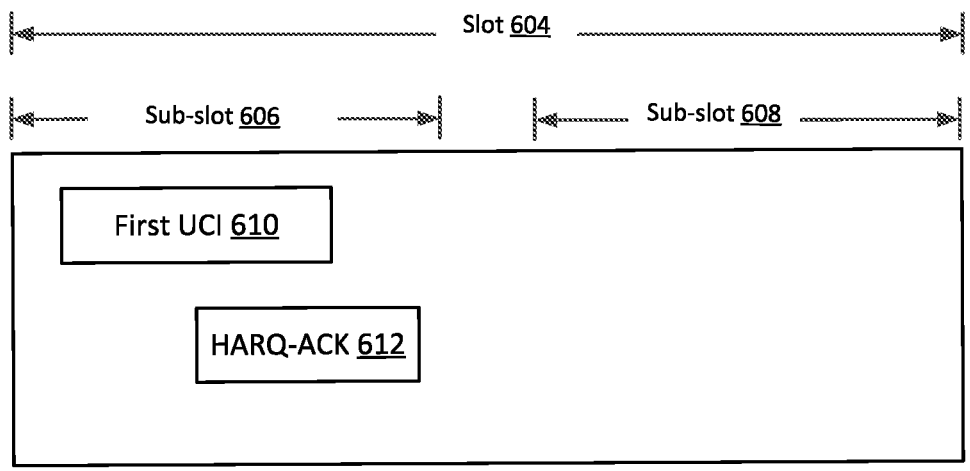
FIG. 6 illustrates a communication scheme in which a physical uplink control channel (PUCCH) carrying uplink control information (UCI) collides with a PUCCH carrying a HARQ-ACK according to one or more aspects of the present disclosure.

FIG. 6 illustrates a communication scheme 600 in which a PUCCH carrying first UCI collides with a PUCCH carrying a HARQ-ACK according to one or more aspects of the present disclosure. The communication scheme 600 may be employed by UEs such as the UEs 115 and BSs such as the BSs 105 in a network such as the network 100. In FIG. 6, the slot 604 may be partitioned into a sub-slot 606 and a sub-slot 608. Each of the sub-slots 606 and 608 may include, for example, seven symbols. The HARQ-ACK 612 may be based on a HARQ-ACK codebook associated with a duration that is sub-slot-based. The transmission of HARQ-ACK 612 may be sub-slot-based, and the transmission of the first UCI 610 may be slot-based. Additionally, the HARQ-ACK 612 and the first UCI 610 may have a common priority. For example, the HARQ-ACK 612 and the first UCI 610 may correspond to a high priority. In this example, the first UCI 610 may be a SR. In another example, the HARQ-ACK and the first UCI 610 may correspond to a low priority. In this example, the first UCI 610 may be CSI or a SR. The BS may transmit scheduling information for transmitting the HARQ-ACK 612 during a first time period and the first UCI 610 during a second time period.

The UE 115 may receive the scheduling information from the BS and transmit the set of HARQ-ACKs during the first time period and the first UCI 610 during the second time period based on the scheduling information. A PUCCH carrying HARQ-ACK 612 may use resources in the sub-slot 606, and a PUCCH carrying first UCI 610 may use resources in the slot 604 and in the sub-slot 606. The UE 115 may determine whether the HARQ-ACK 612 and the first UCI 610 have a common priority. The UE115 may determine whether a transmission of the HARQ-ACK 612 and a transmission of the first UCI 610 collide based on the scheduling information. The UE 115 may transmit to the BS, a UL communication signal including the HARQ-ACK 612 multiplexed with the first UCI 610 based on the first scheduling information in response to a determination that the HARQ-ACK 612 and the first UCI 610 have a common priority and in response to a determination that transmission of the HARQ-ACK 612 and the transmission of the first UCI 610 collide based on the scheduling information. The BS 105 may receive the UL communication signal and based on multiplexing rules, determine the HARQ-ACK 612 and the first UCI 610. The UE 115 may transmit the HARQ-ACK 612 and the first UCI 610 in two separate transmissions in response to a determination that the HARQ-ACK 612 and the first UCI 610 do not have a common priority or in response to a determination that transmission of the HARQ-ACK 612 and the transmission of the first UCI 610 does not collide based on the scheduling information.

In the example illustrated in FIGS. 5 and 6, the slot configuration (e.g., slot-based or sub-slot-based) of the first UCI may be independent of the slot configuration of the HARQ-ACK and/or the HARQ-ACK codebook.

Figure 7:
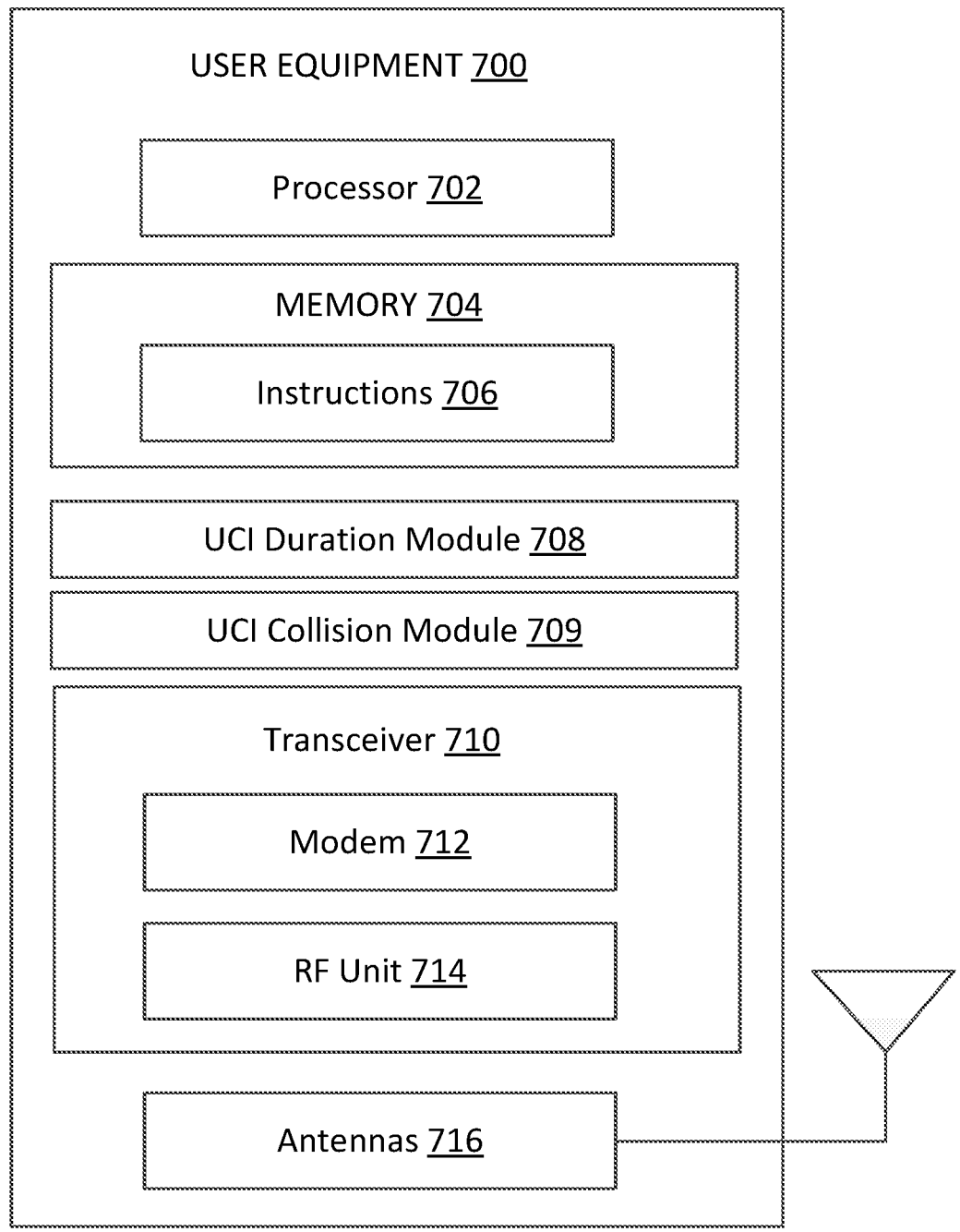
FIG. 7 is a block diagram of a UE according to one or more aspects of the present disclosure.

FIG. 7 is a block diagram of a UE 700 according to one or more aspects of the present disclosure. The UE 700 may be a UE 115 discussed above in FIG. 1. As shown, the UE 700 may include a processor 702, a memory 704, a UCI duration module 708, a UCI collision module 709, a transceiver 710 including a modem subsystem 712 and a radio frequency (RF) unit 714, and one or more antennas 716. These elements may be in direct or indirect communication with each other, for example via one or more buses.

The processor 702 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 704 includes a non-transitory computer-readable medium. The memory 704 may store, or have recorded thereon, instructions 706. The instructions 706 may include instructions that, when executed by the processor 702, cause the processor 702 to perform the operations described herein with reference to the UE 115 in connection with aspects of the present disclosure, for example, aspects of FIGS. 1-6, 9, and 10. Instructions 706 may also be referred to as program code. The program code may be for causing a wireless communication device to perform these operations, for example, by causing one or more processors (such as processor 702) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

In some aspects, the UE 700 includes the UCI duration module 708, but not the UCI collision module 709, includes the UCI collision module 709, but not the UCI duration module 708, or includes both the UCI duration module 708 and the UCI collision module 709. The UCI duration module 708 and/or the UCI collision module 709 may be implemented via hardware, software, or combinations thereof. The UCI duration module 708 and/or the UCI collision module 709 may be implemented as a processor, circuit, and/or instructions 706 stored in the memory 704 and executed by the processor 702. In some instances, the UCI duration module 708 and/or the UCI collision module 709 can be integrated within the modem subsystem 712. The UCI duration module 708 and/or the UCI collision module 709 can be implemented by a combination of software components (e.g., executed by a DSP or a general processor) and hardware components (e.g., logic gates and circuitry) within the modem subsystem 712. The UCI duration module 708 and/or the UCI collision module 709 may be used for various aspects of the present disclosure, for example, aspects of FIGS. 1-6, 9, and 10.

In some aspects, the UCI duration module 708 may be configured to receive from a BS, scheduling information for transmitting a HARQ-ACK and UCI during a time period, the UCI including CSI or a SR. The UCI duration module 708 may be configured to determine that the UCI and a HARQ-ACK codebook have a common priority, the HARQ-ACK being based on the HARQ-ACK codebook. The UCI duration module 708 may be configured to transmit to the BS, the HARQ-ACK and the UCI during the time period based on the scheduling information, the transmitted UCI using resources determined based on a duration associated with the HARQ-ACK codebook, and the duration being based on the UCI and the HARQ-ACK codebook having the common priority.

In some aspects, the UCI collision module 708 may be configured to receive from a BS, a configuration for a HARQ-ACK codebook, the configuration indicating that a duration associated with the HARQ-ACK codebook is sub-slot-based. The UCI collision module 708 may be configured to receive from the BS, scheduling information for transmitting a set of HARQ-ACKs during a first time period and UCI during a second time period, the set of HARQ-ACKs being based on the HARQ-ACK codebook, the set of HARQ-ACKs and the UCI having a common priority, and the UCI including CSI or a SR. The UCI collision module 708 may be configured to transmit to the BS, a UL communication signal including the set of HARQ-ACKs multiplexed with the UCI based on the scheduling information when the first time period overlaps with the second time period.

As shown, the transceiver 710 may include the modem subsystem 712 and the RF unit 714. The transceiver 710 can be configured to communicate bi-directionally with other devices, such as the BSs 105 or BS 800. The modem subsystem 712 may be configured to modulate and/or encode the data from the memory 704, the UCI duration module 708, and/or the UCI collision module 709 according to a modulation and coding scheme (MCS), e.g., a low-density parity check (LDPC) coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data from the modem subsystem 712 (on outbound transmissions) or of transmissions originating from another source such as a UE 115 or a BS 105, 800. The RF unit 714 may be further configured to perform analog beamforming in conjunction with the digital beamforming. Although shown as integrated together in transceiver 710, the modem subsystem 712 and the RF unit 714 may be separate devices that are coupled together at the UE 115 to enable the UE 115 to communicate with other devices.

The RF unit 714 may provide the modulated and/or processed data, e.g. data packets (or, more generally, data messages that may contain one or more data packets and other information), to the antennas 716 for transmission to one or more other devices. The antennas 716 may further receive data messages transmitted from other devices. The antennas 716 may provide the received data messages for processing and/or demodulation at the transceiver 710. The transceiver 710 may provide the demodulated and decoded data (e.g., scheduling information, configuration for a HARQ-ACK codebook, an indication of a priority of HARQ-ACK, an indication of a priority of a SR, etc.) to the UCI duration module 708 and/or the UCI collision module 709 for processing. The antennas 716 may include multiple antennas of similar or different designs in order to sustain multiple transmission links. The RF unit 714 may configure the antennas 716. The antenna(s) 716 may correspond to the antenna element(s) or port(s) discussed in the present disclosure.

In some aspects, the transceiver 710 may coordinate with the UCI duration module 708 to receive scheduling information for transmitting a HARQ-ACK and UCI during a time period, to transmit the HARQ-ACK and the UCI during the time period based on the scheduling information, and/or to receive a configuration for one or more HARQ-ACK codebooks. Additionally, the transceiver 710 may coordinate with the UCI collision module 709 to receive a configuration for a HARQ-ACK, receive scheduling information for transmitting a set of HARQ-ACKs and UCI, to transmit a UL communication signal including the set of HARQ-ACKs multiplexed with the UCI, and/or the transmit the set of HARQ-ACKs and the UCI in two separate transmissions. In some aspects, the UE 700 can include multiple transceivers 710 implementing different radio access technologies (RATs) (e.g., NR and LTE). In an aspect, the UE 700 can include a single transceiver 710 implementing multiple RATs (e.g., NR and LTE). In an aspect, the transceiver 710 can include various components, where different combinations of components can implement different RATs.

Figure 8:
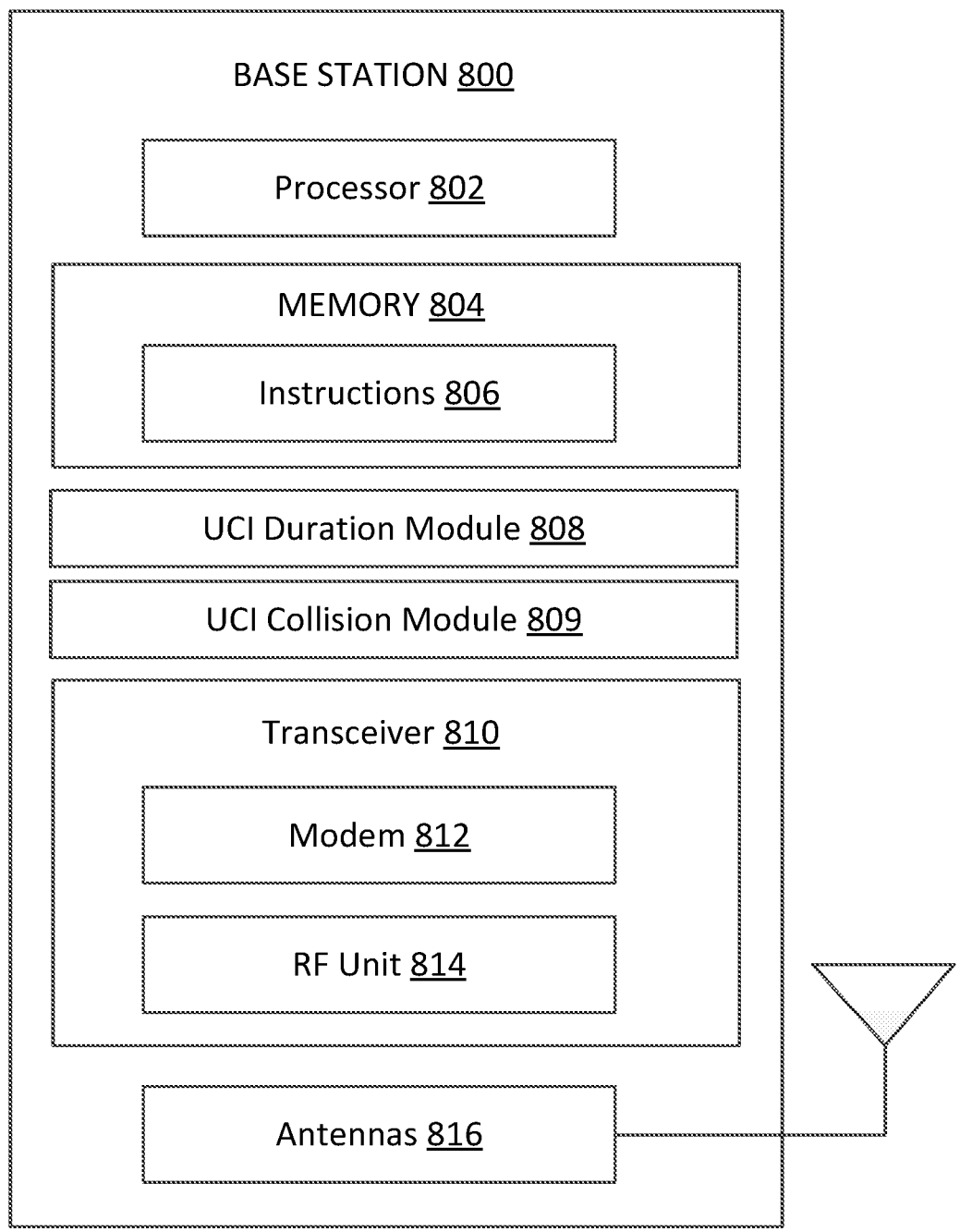
FIG. 8 is a block diagram of a base station (BS) according to one or more aspects of the present disclosure.

FIG. 8 is a block diagram of a BS 800 according to one or more aspects of the present disclosure. The BS 800 may be a BS 105 as discussed above in FIG. 1. As shown, the BS 800 may include a processor 802, a memory 804, a UCI duration module 808, a UCI collision module 809, a transceiver 810 including a modem subsystem 812 and a RF unit 814, and one or more antennas 816. These elements may be in direct or indirect communication with each other, for example via one or more buses.

The processor 802 may have various features as a specific-type processor. For example, these may include a CPU, a DSP, an ASIC, a controller, a FPGA device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 804 may include a non-transitory computer-readable medium. The memory 804 may store instructions 806. The instructions 806 may include instructions that, when executed by the processor 802, cause the processor 802 to perform operations described herein, for example, aspects of FIGS. 1-6, 11, and 12. Instructions 806 may also be referred to as code, which may be interpreted broadly to include any type of computer-readable statement(s) as discussed above with respect to FIG. 7.

In some aspects, the BS 800 includes the UCI duration module 808, but not the UCI collision module 809, includes the UCI collision module 809, but not the UCI duration module 808, or includes both the UCI duration module 808 and the UCI collision module 809. The UCI duration module 808 and/or the UCI collision module 809 may be implemented via hardware, software, or combinations thereof. The UCI duration module 808 and/or the UCI collision module 809 may be implemented as a processor, circuit, and/or instructions 806 stored in the memory 804 and executed by the processor 802. In some instances, the UCI duration module 808 and/or the UCI collision module 809 can be integrated within the modem subsystem 812. The UCI duration module 808 and/or the UCI collision module 809 can be implemented by a combination of software components (e.g., executed by a DSP or a general processor) and hardware components (e.g., logic gates and circuitry) within the modem subsystem 812. The UCI duration module 808 and/or the UCI collision module 809 may be used for various aspects of the present disclosure, for example, aspects of FIGS. 1-6, 11, and 12.

In some aspects, the UCI collision module 809 may be configured to transmit to a UE, scheduling information for transmitting a HARQ-ACK and UCI during a time period, the UCI including CSI or a SR, and the HARQ-ACK and the UCI having a common priority. The UCI collision module 809 may be configured to receive from the UE, the HARQ-ACK and the UCI based on the scheduling information, the received HARQ-ACK being based on a HARQ-ACK codebook, and the received UCI using resources based on a duration associated with the HARQ-ACK codebook.

In some aspects, the UCI collision module 809 may be configured to transmit to a UE, a configuration for a HARQ-ACK codebook, the configuration indicating that a duration associated with the HARQ-ACK codebook is sub-slot-based. The UCI collision module 809 may be configured to transmit scheduling information for transmitting a set of HARQ-ACKs during a first time period and UCI during a second time period, the set of HARQ-ACKs being based on the HARQ-ACK codebook, the set of HARQ-ACKs and the UCI having a common priority, and the UCI CSI or a SR. The UCI collision module 809 may be configured to receive a UL communication signal including the set of HARQ-ACKs multiplexed with the UCI based on the scheduling information when the first time period overlaps with the second time period.

As shown, the transceiver 810 may include the modem subsystem 812 and the RF unit 814. The transceiver 810 can be configured to communicate bi-directionally with other devices, such as the UEs 115 and/or 700, a BS, and/or another core network element. The modem subsystem 812 may be configured to modulate and/or encode data according to a MCS, e.g., a LDPC coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data (e.g., grants, resource allocations) from the modem subsystem 812 (on outbound transmissions) or of transmissions originating from another source such as a UE 115 or 700. The RF unit 814 may be further configured to perform analog beamforming in conjunction with the digital beamforming. Although shown as integrated together in transceiver 810, the modem subsystem 812 and/or the RF unit 814 may be separate devices that are coupled together at the BS 105 to enable the BS 105 to communicate with other devices.

The RF unit 814 may provide the modulated and/or processed data, e.g. data packets (or, more generally, data messages that may contain one or more data packets and other information), to the antennas 816 for transmission to one or more other devices. This may include, for example, transmission of information to complete attachment to a network and communication with a camped UE 115, or 700 according to some aspects of the present disclosure. The antennas 816 may further receive data messages transmitted from other devices and provide the received data messages for processing and/or demodulation at the transceiver 810. The transceiver 810 may provide the demodulated and decoded data (e.g., a set of HARQ-ACKs, the UCI, UL communication signals, etc.) to the UCI duration module 808 and/or the UCI collision module 809 for processing. The antennas 816 may include multiple antennas of similar or different designs in order to sustain multiple transmission links.

In some aspects, the transceiver 810 may coordinate with the UCI duration module 808 and/or the UCI collision module 809 to, for example, transmit scheduling information for transmitting a HARQ-ACK and/or UCI (e.g., CSI or SR), to receive the set of HARQ-ACKs and/or the UCI, to transmit a configuration for a HARQ-ACK codebook, a priority of a SR, and/or a priority of a HARQ-ACK codebook. In some aspects, the BS 800 can include multiple transceivers 810 implementing different RATs (e.g., NR and LTE). In an aspect, the BS 800 can include a single transceiver 810 implementing multiple RATs (e.g., NR and LTE). In an aspect, the transceiver 810 can include various components, where different combinations of components can implement different RATs.

Figure 9:
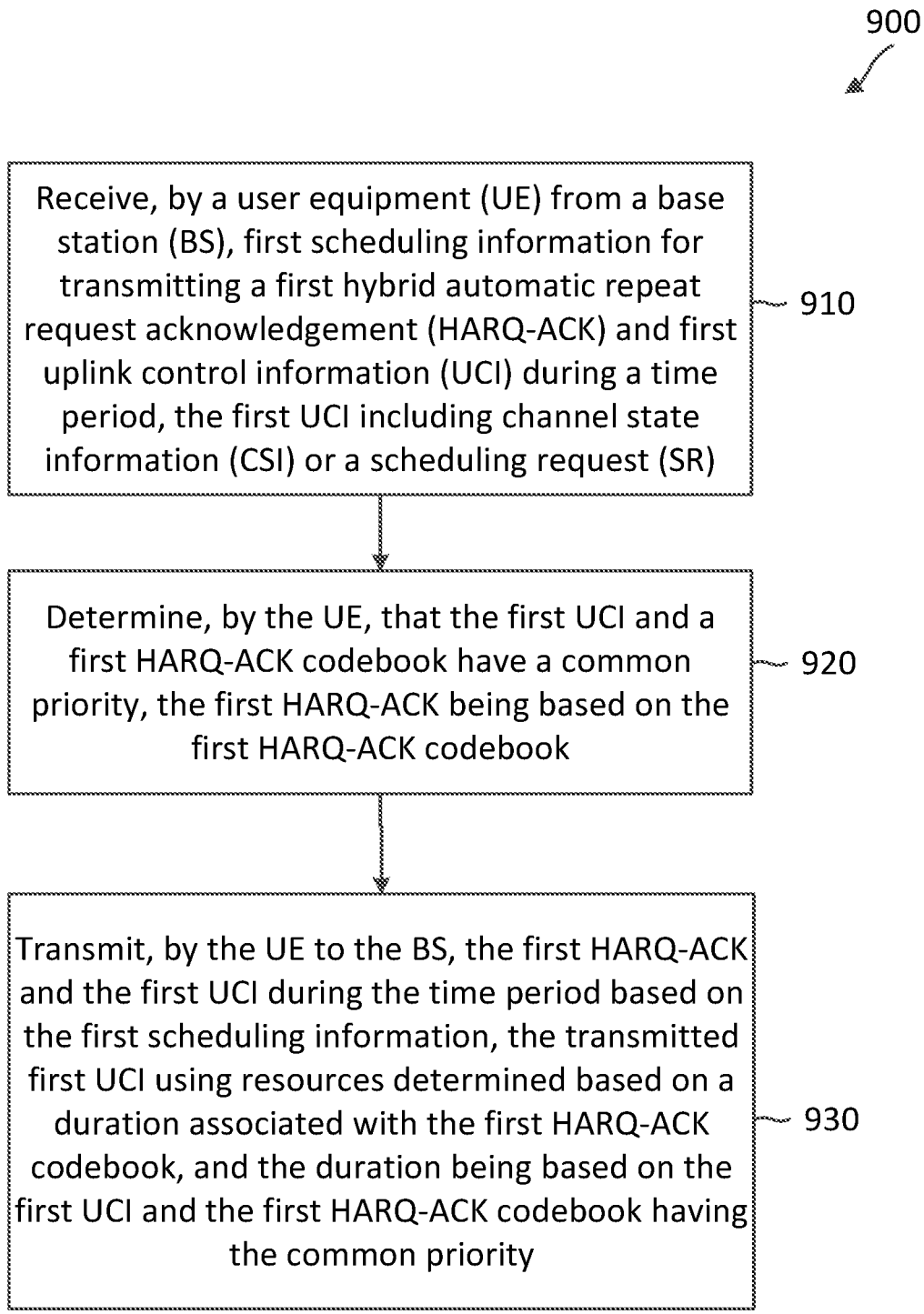
FIG. 9 illustrates a flow diagram of a wireless communication method according to some aspects of the present disclosure.

FIG. 9 is a flow diagram of a communication method 900 according to one or more aspects of the present disclosure. Aspects of the method 900 can be executed by a wireless communication device, such as the UEs 105 and/or 700 utilizing one or more components, such as the processor 702, the memory 704, the UCI duration module 708, the UCI collision module 709, the transceiver 710, the modem 712, the one or more antennas 716, and various combinations thereof. As illustrated, the method 900 includes a number of enumerated blocks, but the method 900 may include additional blocks before, after, and in between the enumerated blocks. In some instances, one or more of the enumerated blocks may be omitted or performed in a different order.

At block 910, the method 900 includes receiving, by a user equipment (UE) from a base station (BS), first scheduling information for transmitting a first hybrid automatic repeat request acknowledgement (HARQ-ACK) and first uplink control information (UCI) during a time period, the first UCI including channel state information (CSI) or a scheduling request (SR).

At block 920, the method 900 includes determining, by the UE, that the first UCI and a first HARQ-ACK codebook have a common priority, the first HARQ-ACK being based on the first HARQ-ACK codebook.

At block 930, the method 900 includes transmitting, by the UE to the BS, the first HARQ-ACK and the first UCI during the time period based on the first scheduling information, the transmitted first UCI using resources determined based on a duration associated with the first HARQ-ACK codebook, and the duration being based on the first UCI and the first HARQ-ACK codebook having the common priority.

Figure 10:
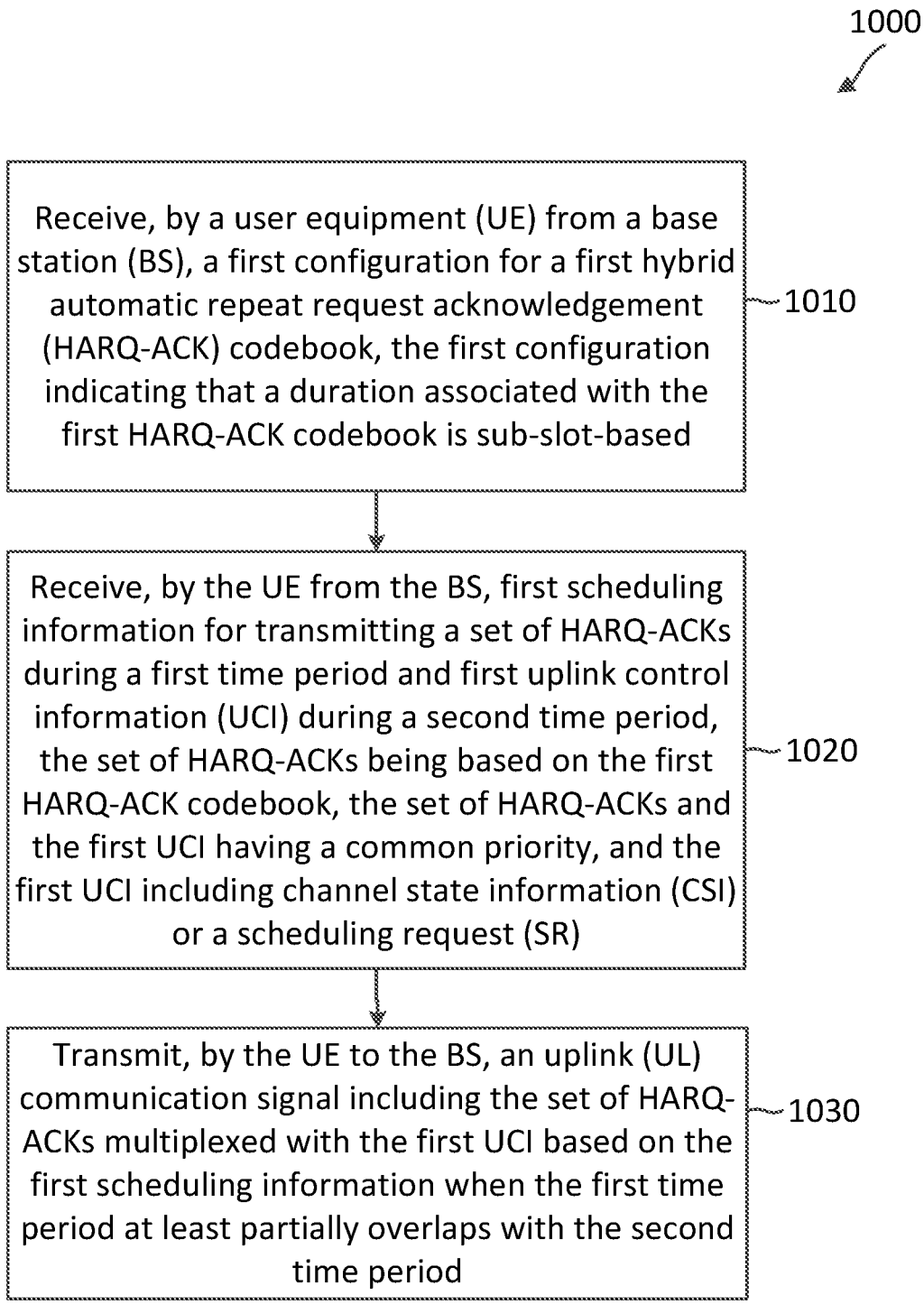
FIG. 10 illustrates a flow diagram of a wireless communication method according to some aspects of the present disclosure.

FIG. 10 is a flow diagram of a communication method 1000 according to one or more aspects of the present disclosure. Aspects of the method 1000 can be executed by a wireless communication device, such as the UEs 105 and/or 700 utilizing one or more components, such as the processor 702, the memory 704, the UCI duration module 708, the UCI collision module 709, the transceiver 710, the modem 712, the one or more antennas 716, and various combinations thereof. As illustrated, the method 1000 includes a number of enumerated blocks, but the method 1000 may include additional blocks before, after, and in between the enumerated blocks. In some instances, one or more of the enumerated blocks may be omitted or performed in a different order.

At block 1010, the method 1000 includes receiving, by a user equipment (UE) from a base station (BS), a first configuration for a first hybrid automatic repeat request acknowledgement (HARQ-ACK) codebook, the first configuration indicating that a duration associated with the first HARQ-ACK codebook is sub-slot-based.

At block 1020, the method 1000 includes receiving, by the UE from the BS, first scheduling information for transmitting a set of HARQ-ACKs during a first time period and first uplink control information (UCI) during a second time period, the set of HARQ-ACKs being based on the first HARQ-ACK codebook, the set of HARQ-ACKs and the first UCI having a common priority, and the first UCI including channel state information (CSI) or a scheduling request (SR).

At block 1030, the method 1000 includes transmitting, by the UE to the BS, an uplink (UL) communication signal including the set of HARQ-ACKs multiplexed with the first UCI based on the first scheduling information when the first time period at least partially overlaps with the second time period.

Figure 11:
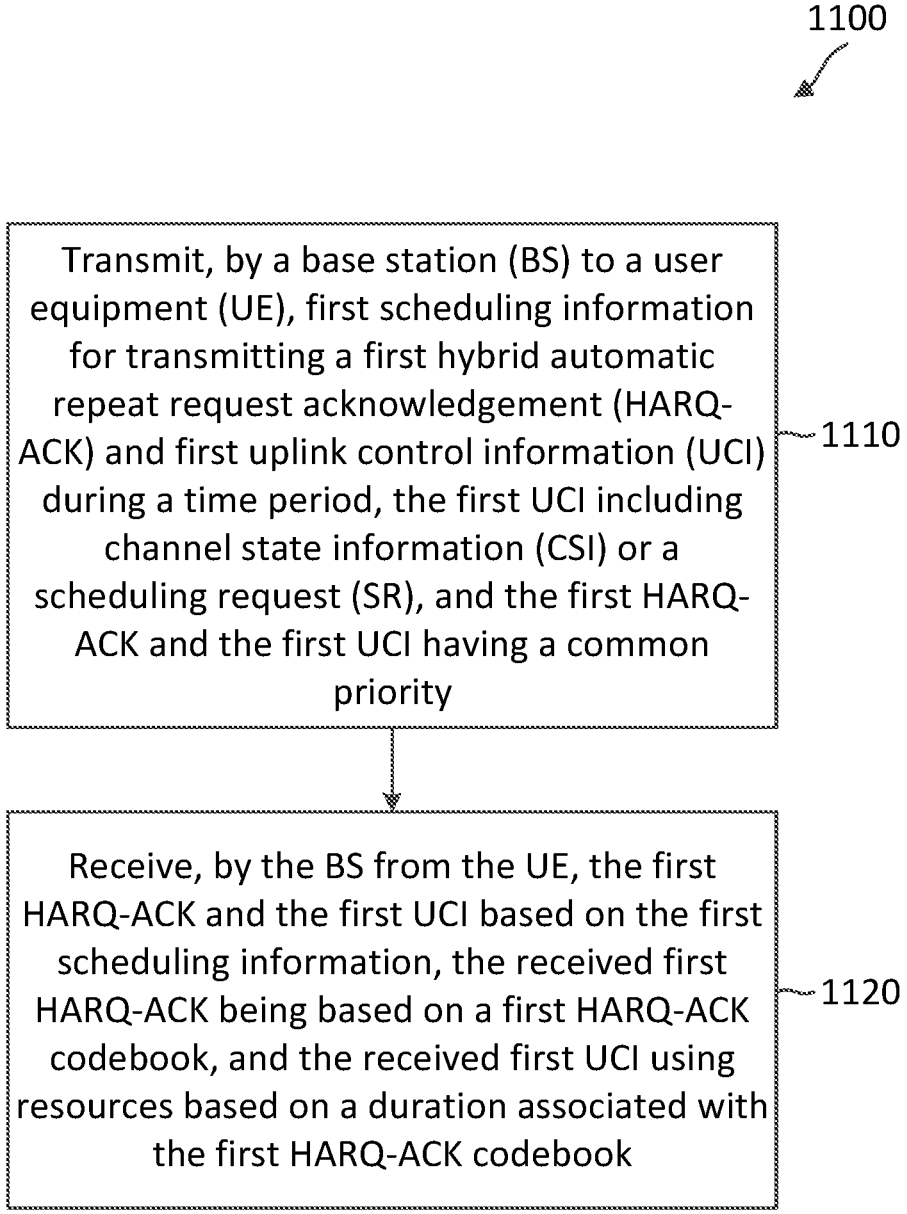
FIG. 11 illustrates a flow diagram of a wireless communication method according to some aspects of the present disclosure.

FIG. 11 is a flow diagram of a communication method 1100 according to one or more aspects of the present disclosure. Aspects of the method 1100 can be executed by a wireless communication device, such as the BSs 105 and/or 800 utilizing one or more components, such as the processor 802, the memory 804, the UCI duration module 808, the UCI collision module 809, the transceiver 810, the modem 812, the one or more antennas 816, and various combinations thereof. As illustrated, the method 1100 includes a number of enumerated blocks, but the method 1100 may include additional blocks before, after, and in between the enumerated blocks. In some instances, one or more of the enumerated blocks may be omitted or performed in a different order.

At block 1110, the method 1100 includes transmitting, by a base station (BS) to a user equipment (UE), first scheduling information for transmitting a first hybrid automatic repeat request acknowledgement (HARQ-ACK) and first uplink control information (UCI) during a time period, the first UCI including channel state information (CSI) or a scheduling request (SR), and the first HARQ-ACK and the first UCI having a common priority.

At block 1120, the method 1100 includes receiving, by the BS from the UE, the first HARQ-ACK and the first UCI based on the first scheduling information, the received first HARQ-ACK being based on a first HARQ-ACK codebook, and the received first UCI using resources based on a duration associated with the first HARQ-ACK codebook.

Figure 12:
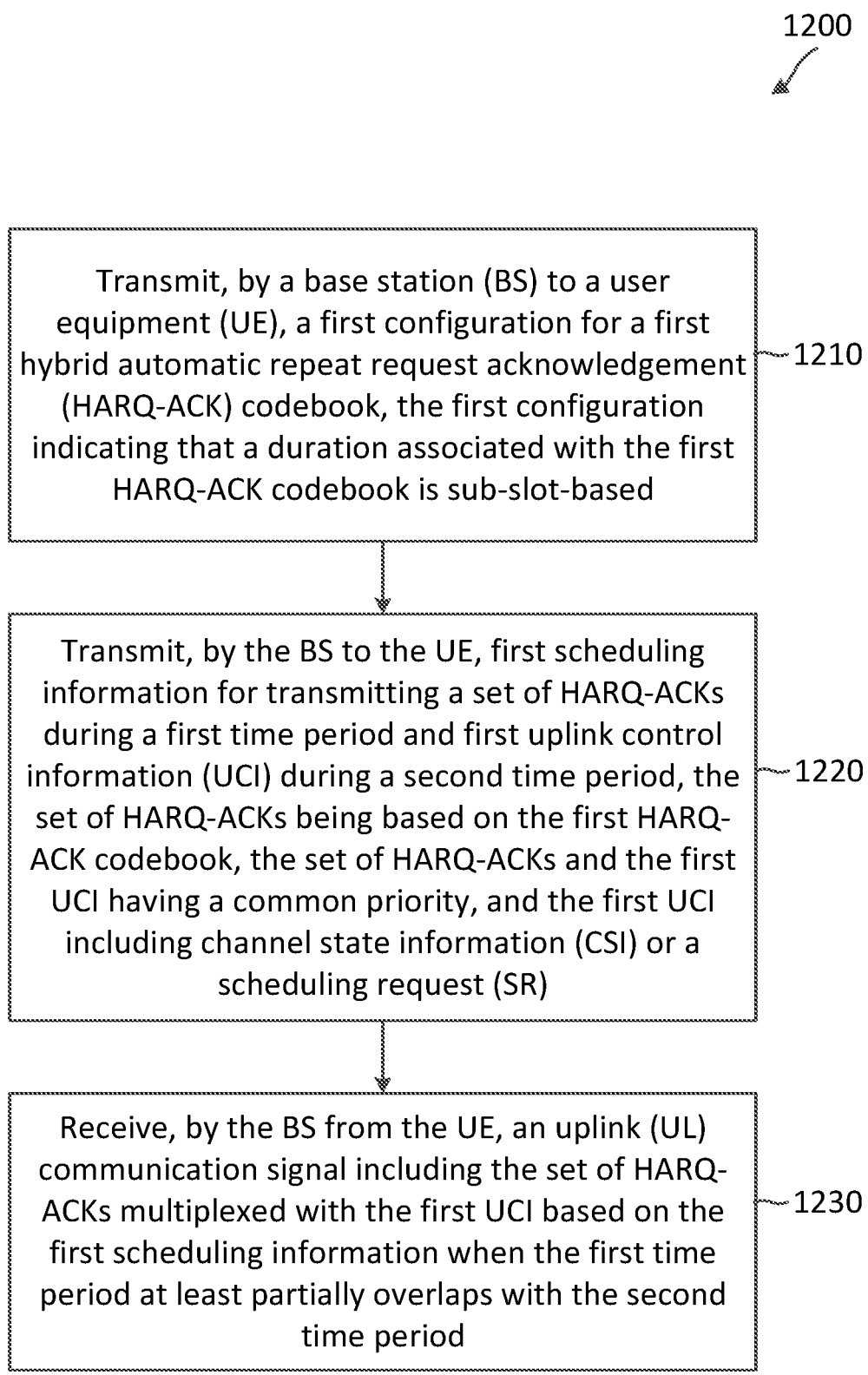
FIG. 12 illustrates a flow diagram of a wireless communication method according to some aspects of the present disclosure.

FIG. 12 is a flow diagram of a communication method 1200 according to one or more aspects of the present disclosure. Aspects of the method 1200 can be executed by a wireless communication device, such as the BSs 105 and/or 800 utilizing one or more components, such as the processor 802, the memory 804, the UCI duration module 808, the UCI collision module 809, the transceiver 810, the modem 812, the one or more antennas 816, and various combinations thereof. As illustrated, the method 1200 includes a number of enumerated blocks, but the method 1200 may include additional blocks before, after, and in between the enumerated blocks. In some instances, one or more of the enumerated blocks may be omitted or performed in a different order.

At block 1210, the method 1200 includes transmitting, by a base station (BS) to a user equipment (UE), a first configuration for a first hybrid automatic repeat request acknowledgement (HARQ-ACK) codebook, the first configuration indicating that a duration associated with the first HARQ-ACK codebook is sub-slot-based.

At block 1220, the method 1200 includes transmitting, by the BS to the UE, first scheduling information for transmitting a set of HARQ-ACKs during a first time period and first uplink control information (UCI) during a second time period, the set of HARQ-ACKs being based on the first HARQ-ACK codebook, the set of HARQ-ACKs and the first UCI having a common priority, and the first UCI including channel state information (CSI) or a scheduling request (SR).

At block 1230, the method 1200 includes receiving, by the BS from the UE, an uplink (UL) communication signal including the set of HARQ-ACKs multiplexed with the first UCI based on the first scheduling information when the first time period at least partially overlaps with the second time period.

In some instances, an apparatus comprises: means for receiving from a base station (BS), first scheduling information for transmitting a first hybrid automatic repeat request acknowledgement (HARQ-ACK) and first uplink control information (UCI) during a time period, the first UCI including channel state information (CSI) or a scheduling request (SR); means for determining that the first UCI and a first HARQ-ACK codebook have a common priority, the first HARQ-ACK being based on the first HARQ-ACK codebook; and means for transmitting to the BS, the first HARQ-ACK and the first UCI during the time period based on the first scheduling information, the transmitted first UCI using resources determined based on a duration associated with the HARQ-ACK codebook, and the duration being based on the first UCI and the first HARQ-ACK codebook having the common priority.

In some instances, a method of wireless communication comprises: receiving, by a user equipment (UE) from a base station (BS), a first configuration for a first hybrid automatic repeat request acknowledgement (HARQ-ACK) codebook, the first configuration indicating that a duration associated with the first HARQ-ACK codebook is sub-slot-based; receiving, by the UE from the BS, first scheduling information for transmitting a set of one or more HARQ-ACKs during a first time period and first uplink control information (UCI) during a second time period, the set of HARQ-ACKs being based on the first HARQ-ACK codebook, the set of HARQ-ACKs and the first UCI having a common priority, and the first UCI including channel state information (CSI) or a scheduling request (SR); and transmitting, by the UE to the BS, an uplink (UL) communication signal including the set of HARQ-ACKs multiplexed with the first UCI based on the first scheduling information when the first time period at least partially overlaps with the second time period.

Each transmitted HARQ-ACK of the set of HARQ-ACKs can be based on a HARQ-ACK codebook of a set of HARQ-ACK codebooks. In some aspects, the set of HARQ-ACKs includes a first HARQ-ACK and a second HARQ-ACK, and when the first time period is mutually exclusive of the second time period, the method further comprises: transmitting, by the UE to the BS, the first HARQ-ACK in a first sub-slot and the second HARQ-ACK in the second sub-slot during the first time period; and transmitting, by the UE to the BS, the first UCI during the second time period. In some aspects, the method comprises: receiving, by the UE from the BS, a second configuration for a physical uplink control channel (PUCCH) resource carrying the first UCI, the second configuration indicating that the PUCCH resource is slot-based. In some aspects, the method comprises: receiving, by the UE from the BS, a second configuration for a PUCCH resource carrying the first UCI, the second configuration indicating that the PUCCH resource is sub-slot-based.

In some instances, the set of HARQ-ACKs includes a first HARQ-ACK and a second HARQ-ACK, a slot contains a first sub-slot and a second sub-slot, and the first scheduling information indicates transmitting the first HARQ-ACK in the first sub-slot, transmitting the second HARQ-ACK in the second sub-slot, and transmitting the first UCI in the slot. In some aspects, the method comprises: determining, by the UE, whether transmission of the first UCI collides with transmissions of the first and second HARQ-ACKs based on the first scheduling information; and transmitting, by the UE to the BS, an error event in response to a determination that transmission of the first UCI collides with transmissions of the first and second HARQ-ACKs.

In some instances, the set of HARQ-ACKs includes a HARQ-ACK and the method further comprises: receiving, by the UE from the BS, a second configuration for a PUCCH carrying the first UCI, the second configuration indicating that the PUCCH is slot-based, wherein the first and second time periods at least partially overlap.

In some aspects, the method comprises: receiving, by the UE from the BS, a second configuration for a second HARQ-ACK codebook, the first configuration indicating that the first HARQ-ACK codebook corresponds to a first priority, and the second configuration indicating that the second HARQ-ACK codebook corresponds to a second priority different from the first priority; and receiving, by the UE from the BS, a first indication that the first UCI corresponds to the first priority and a second indication that second UCI corresponds to the second priority, the second UCI including second CSI or a second SR.

In some instances, an apparatus comprises: a transceiver configured to: receive, by a user equipment (UE) from a base station (BS), a first configuration for a first hybrid automatic repeat request acknowledgement (HARQ-ACK) codebook, the first configuration indicating that a duration associated with the first HARQ-ACK codebook is sub-slot-based; receive, by the UE from the BS, first scheduling information for transmitting a set of HARQ-ACKs during a first time period and first uplink control information (UCI) during a second time period, the set of HARQ-ACKs being based on the first HARQ-ACK codebook, the set of HARQ-ACKs and the first UCI having a common priority, and the first UCI including channel state information (CSI) or a scheduling request (SR); and transmit, by the UE to the BS, an uplink (UL) communication signal including the set of HARQ-ACKs multiplexed with the first UCI based on the first scheduling information when the first time period at least partially overlaps with the second time period.

In some aspects, each transmitted HARQ-ACK of the set of HARQ-ACKs is based on a HARQ-ACK codebook of a set of HARQ-ACK codebooks. In some aspects, the set of HARQ-ACKs includes a first HARQ-ACK and a second HARQ-ACK, and when the first time period is mutually exclusive of the second time period, the transceiver is configured to: transmit, by the UE to the BS, the first HARQ-ACK in a first sub-slot and the second HARQ-ACK in the second sub-slot during the first time period; and transmit, by the UE to the BS, the first UCI during the second time period.

In some aspects, the transceiver is configured to receive, by the UE from the BS, a second configuration for a physical uplink control channel (PUCCH) resource carrying the first UCI, the second configuration indicating that the PUCCH resource is slot-based.

In some aspects, the transceiver is configured to: receive, by the UE from the BS, a second configuration for a physical uplink control channel (PUCCH) resource carrying the first UCI, the second configuration indicating that the PUCCH resource is sub-slot-based. In some instances, the set of HARQ-ACKs includes a first HARQ-ACK and a second HARQ-ACK, a slot contains a first sub-slot and a second sub-slot, and the first scheduling information indicates transmitting the first HARQ-ACK in the first sub-slot, transmitting the second HARQ-ACK in the second sub-slot, and transmitting the first UCI in the slot. In some instances, the apparatus further comprises a processor configured to determine, by the UE, whether transmission of the first UCI collides with transmissions of the first and second HARQ-ACKs based on the first scheduling information; and the transceiver is configured to transmit, by the UE to the BS, an error event in response to a determination that transmission of the first UCI collides with transmissions of the first and second HARQ-ACKs.

In some aspects, the set of HARQ-ACKs includes a HARQ-ACK, and the transceiver is configured to receive, by the UE from the BS, a second configuration for a PUCCH carrying the first UCI, the second configuration indicating that the PUCCH is slot-based, wherein the first and second time periods at least partially overlap.

In some aspects, the transceiver is configured to: receive, by the UE from the BS, a second configuration for a second HARQ-ACK codebook, the first configuration indicating that the first HARQ-ACK codebook corresponds to a first priority, and the second configuration indicating that the second HARQ-ACK codebook corresponds to a second priority different from the first priority; and receive, by the UE from the BS, a first indication that the first UCI corresponds to the first priority and a second indication that second UCI corresponds to the second priority, the second UCI including second CSI or a second SR.

In some instances, a non-transitory computer-readable medium having program code recorded thereon is provided with the program code comprising: code for causing a user equipment (UE) to receive from a base station (BS), a first configuration for a first hybrid automatic repeat request acknowledgement (HARQ-ACK) codebook, the first configuration indicating that a duration associated with the first HARQ-ACK codebook is sub-slot-based; code for causing the UE to receive from the BS, first scheduling information for transmitting a set of HARQ-ACKs during a first time period and first uplink control information (UCI) during a second time period, the set of HARQ-ACKs being based on the first HARQ-ACK codebook, the set of HARQ-ACKs and the first UCI having a common priority, and the first UCI including channel state information (CSI) or a scheduling request (SR); and code for causing the UE to transmit to the BS, an uplink (UL) communication signal including the set of HARQ-ACKs multiplexed with the first UCI based on the first scheduling information when the first time period at least partially overlaps with the second time period.

In some aspects, the set of HARQ-ACKs includes a first HARQ-ACK and a second HARQ-ACK, and when the first time period is mutually exclusive of the second time period, the program code further comprises: code for causing the UE to transmit to the BS, the first HARQ-ACK in a first sub-slot and the second HARQ-ACK in the second sub-slot during the first time period; and code for causing the UE to transmit to the BS, the first UCI during the second time period.

In some aspects, the set of HARQ-ACKs includes a first HARQ-ACK and a second HARQ-ACK, a slot contains a first sub-slot and a second sub-slot, and the first scheduling information indicates transmitting the first HARQ-ACK in the first sub-slot, transmitting the second HARQ-ACK in the second sub-slot, and transmitting the first UCI in the slot. In some instances, the program code further comprises: code for causing the UE to determine whether transmission of the first UCI collides with transmissions of the first and second HARQ-ACKs based on the first scheduling information; and code for causing the UE to transmit to the BS, an error event in response to a determination that transmission of the first UCI collides with transmissions of the first and second HARQ-ACKs.

In some aspects, an apparatus comprises: means for receiving, by a user equipment (UE) from a base station (BS), a first configuration for a first hybrid automatic repeat request acknowledgement (HARQ-ACK) codebook, the first configuration indicating that a duration associated with the first HARQ-ACK codebook is sub-slot-based; means for receiving, by the UE from the BS, first scheduling information for transmitting a set of HARQ-ACKs during a first time period and first uplink control information (UCI) during a second time period, the set of HARQ-ACKs being based on the first HARQ-ACK codebook, the set of HARQ-ACKs and the first UCI having a common priority, and the first UCI including channel state information (CSI) or a scheduling request (SR); and means for transmitting, by the UE to the BS, an uplink (UL) communication signal including the set of HARQ-ACKs multiplexed with the first UCI based on the first scheduling information when the first time period at least partially overlaps with the second time period.

In some aspects, an apparatus comprises: means for transmitting, by a base station (BS) to a user equipment (UE), first scheduling information for transmitting a first hybrid automatic repeat request acknowledgement (HARQ-ACK) and first uplink control information (UCI) during a time period, the first UCI including channel state information (CSI) or a scheduling request (SR), and the first HARQ-ACK and the first UCI having a common priority; and means for receiving, by the BS from the UE, the first HARQ-ACK and the first UCI based on the first scheduling information, the received first HARQ-ACK being based on a first HARQ-ACK codebook, and the received first UCI using resources based on a duration associated with the HARQ-ACK codebook.

In some aspects, a method of wireless communication comprises: transmitting, by a base station (BS) to a user equipment (UE), a first configuration for a first hybrid automatic repeat request acknowledgement (HARQ-ACK) codebook, the first configuration indicating that a duration associated with the first HARQ-ACK codebook is sub-slot-based; transmitting, by the BS to the UE, first scheduling information for transmitting a set of HARQ-ACKs during a first time period and first uplink control information (UCI) during a second time period, the set of HARQ-ACKs being based on the first HARQ-ACK codebook, the set of HARQ-ACKs and the first UCI having a common priority, and the first UCI including channel state information (CSI) or a scheduling request (SR); and receiving, by the BS from the UE, an uplink (UL) communication signal including the set of HARQ-ACKs multiplexed with the first UCI based on the first scheduling information when the first time period at least partially overlaps with the second time period.

In some aspects, each transmitted HARQ-ACK of the set of HARQ-ACKs is based on a HARQ-ACK codebook of a set of HARQ-ACK codebooks.

In some aspects, the set of HARQ-ACKs includes a first HARQ-ACK and a second HARQ-ACK, and when the first time period is mutually exclusive of the second time period, the method further comprises: receiving, by the BS from the UE, the first HARQ-ACK in a first sub-slot and the second HARQ-ACK in the second sub-slot during the first time period; and receiving, by the BS from the UE, the first UCI during the second time period. In some instances, the method comprises: transmitting, by the BS to the UE, a second configuration for a physical uplink control channel (PUCCH) resource carrying the first UCI, the second configuration indicating that the PUCCH resource is one of slot-based or sub-slot-based.

In some aspects, the set of HARQ-ACKs includes a first HARQ-ACK and a second HARQ-ACK, a slot contains a first sub-slot and a second sub-slot, and the first scheduling information indicates transmitting the first HARQ-ACK in the first sub-slot, transmitting the second HARQ-ACK in the second sub-slot, and transmitting the first UCI in the slot. In some instances, the method comprises: receiving, by the BS from the UE, an error event if transmission of the first UCI collides with transmissions of the first and second HARQ-ACKs based on the first scheduling information.

In some aspects, the set of HARQ-ACKs includes a HARQ-ACK and the method further comprises: transmitting, by the BS to the UE, a second configuration for a PUCCH carrying the first UCI, the second configuration indicating that the PUCCH is slot-based, wherein the first and second time periods at least partially overlap.

In some aspects, the method comprises: transmitting, by the BS to the UE, a second configuration for a second HARQ-ACK codebook, the first configuration indicating that the first HARQ-ACK codebook corresponds to a first priority, and the second configuration indicating that the second HARQ-ACK codebook corresponds to a second priority different from the first priority; and transmitting, by the BS to the UE, a first indication that the first UCI corresponds to the first priority and a second indication that second UCI corresponds to the second priority, the second UCI including second CSI or a second SR.

In some aspects, an apparatus comprises a transceiver configured to: transmit, by a base station (BS) to a user equipment (UE), a first configuration for a first hybrid automatic repeat request acknowledgement (HARQ-ACK) codebook, the first configuration indicating that a duration associated with the first HARQ-ACK codebook is sub-slot-based; transmit, by the BS to the UE, first scheduling information for transmitting a set of HARQ-ACKs during a first time period and first uplink control information (UCI) during a second time period, the set of HARQ-ACKs being based on the first HARQ-ACK codebook, the set of HARQ-ACKs and the first UCI having a common priority, and the first UCI including channel state information (CSI) or a scheduling request (SR); and receive, by the BS from the UE, an uplink (UL) communication signal including the set of HARQ-ACKs multiplexed with the first UCI based on the first scheduling information when the first time period at least partially overlaps with the second time period.

In some aspects, each transmitted HARQ-ACK of the set of HARQ-ACKs is based on a HARQ-ACK codebook of a set of HARQ-ACK codebooks. In some aspects, the set of HARQ-ACKs includes a first HARQ-ACK and a second HARQ-ACK, and when the first time period is mutually exclusive of the second time period, the transceiver is configured to: receive, by the BS from the UE, the first HARQ-ACK in a first sub-slot and the second HARQ-ACK in the second sub-slot during the first time period; and receive, by the BS from the UE, the first UCI during the second time period. In some instances, the transceiver is configured to: receive, by the BS from the UE, a second configuration for a physical uplink control channel (PUCCH) resource carrying the first UCI, the second configuration indicating that the PUCCH resource is one of slot-based or sub-slot-based.

In some aspects, the set of HARQ-ACKs includes a first HARQ-ACK and a second HARQ-ACK, a slot contains a first sub-slot and a second sub-slot, and the first scheduling information indicates transmitting the first HARQ-ACK in the first sub-slot, transmitting the second HARQ-ACK in the second sub-slot, and transmitting the first UCI in the slot.

In some aspects, the transceiver is configured to receive, by the BS from the UE, an error event if transmission of the first UCI collides with transmissions of the first and second HARQ-ACKs based on the first scheduling information.

In some aspects, a non-transitory computer-readable medium having program code recorded thereon is provided with the program code comprising: code for causing a base station (BS) to transmit to a user equipment (UE), a first configuration for a first hybrid automatic repeat request acknowledgement (HARQ-ACK) codebook, the first configuration indicating that a duration associated with the first HARQ-ACK codebook is sub-slot-based; code for causing the BS to transmit to the UE, first scheduling information for transmitting a set of HARQ-ACKs during a first time period and first uplink control information (UCI) during a second time period, the set of HARQ-ACKs being based on the first HARQ-ACK codebook, the set of HARQ-ACKs and the first UCI having a common priority, and the first UCI including channel state information (CSI) or a scheduling request (SR); and code for causing the BS to receive from the UE, an uplink (UL) communication signal including the set of HARQ-ACKs multiplexed with the first UCI based on the first scheduling information when the first time period at least partially overlaps with the second time period.

In some aspects, the set of HARQ-ACKs includes a first HARQ-ACK and a second HARQ-ACK, and when the first time period is mutually exclusive of the second time period, the program code includes: code for causing the BS to receive from the UE, the first HARQ-ACK in a first sub-slot and the second HARQ-ACK in the second sub-slot during the first time period; and code for causing the BS to receive from the UE, the first UCI during the second time period.

In some aspects, the set of HARQ-ACKs includes a first HARQ-ACK and a second HARQ-ACK, a slot contains a first sub-slot and a second sub-slot, and the first scheduling information indicates transmitting the first HARQ-ACK in the first sub-slot, transmitting the second HARQ-ACK in the second sub-slot, and transmitting the first UCI in the slot.

In some aspects, the program code includes code for causing the BS to receive from the UE, an error event if transmission of the first UCI collides with transmissions of the first and second HARQ-ACKs based on the first scheduling information.

In some aspects, an apparatus comprises: means for transmitting to a user equipment (UE), a first configuration for a first hybrid automatic repeat request acknowledgement (HARQ-ACK) codebook, the first configuration indicating that a duration associated with the first HARQ-ACK codebook is sub-slot-based; means for transmitting to the UE, first scheduling information for transmitting a set of HARQ-ACKs during a first time period and first uplink control information (UCI) during a second time period, the set of HARQ-ACKs being based on the first HARQ-ACK codebook, the set of HARQ-ACKs and the first UCI having a common priority, and the first UCI including channel state information (CSI) or a scheduling request (SR); and means for receiving from the UE, an uplink (UL) communication signal including the set of HARQ-ACKs multiplexed with the first UCI based on the first scheduling information when the first time period at least partially overlaps with the second time period.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely some examples thereof, but rather, should be fully commensurate with that of the claims appended hereafter and their functional equivalents.

What is claimed is:

1. A method of wireless communication, comprising:
   receiving, by a user equipment (UE) from a base station (BS), a first configuration for a first hybrid automatic repeat request acknowledgement (HARQ-ACK) codebook;
   receiving, by the UE from the BS, first scheduling information for transmitting a first HARQ-ACK and first uplink control information (UCI) during a time period, the first UCI including channel state information (CSI) or a scheduling request (SR), wherein the first configuration indicates that a duration associated with the first HARQ-ACK codebook is sub-slot-based, and wherein a second configuration indicates that a duration associated with the first UCI is slot-based;
   determining, by the UE, that the first UCI and the first HARQ-ACK codebook have a common priority, the first HARQ-ACK being based on the first HARQ-ACK codebook; and
   transmitting, by the UE to the BS, the first HARQ-ACK and the first UCI within a first sub-slot during the time period based on:
      the first scheduling information; and
      the first UCI and the first HARQ-ACK codebook having the common priority.

2. The method of claim 1, wherein the first configuration indicates that the first HARQ-ACK codebook corresponds to one of a high priority or a low priority.

3. The method of claim 1, further comprising:
   receiving, by the UE from the BS, first DL data and second DL data; and
   receiving, by the UE from the BS, an indication that feedback for the first and second DL data belongs to the first HARQ-ACK codebook,
   wherein transmitting the first HARQ-ACK includes transmitting a first HARQ-ACK bit corresponding to the first DL data and transmitting a second HARQ-ACK bit corresponding to the second DL data.

4. The method of claim 1, wherein the first configuration indicates that the first HARQ-ACK codebook corresponds to a first priority; the method further comprises:
   receiving, by the UE from the BS, a third configuration for a second HARQ-ACK codebook, the third configuration indicating that a second duration associated with the second HARQ-ACK codebook is slot-based and that the second HARQ-ACK codebook corresponds to a second priority different from the first priority;
   receiving, by the UE from the BS, a first indication that the first UCI corresponds to the first priority and a second indication that second UCI corresponds to the second priority, the second UCI including second CSI or a second SR;
   receiving, by the UE from the BS, second scheduling information for transmitting a second HARQ-ACK and the second UCI during a second time period; and
   transmitting, by the UE to the BS, the second HARQ-ACK and the second UCI during the second time period based on the second scheduling information, the second HARQ-ACK being based on the second HARQ-ACK codebook.

5. The method of claim 1, further comprising:
   determining, by the UE, that the first HARQ-ACK collides with the first UCI, and
   wherein the transmitting the first HARQ-ACK and the first UCI comprises transmitting the first HARQ-ACK multiplexed with the first UCI based on the first HARQ-ACK colliding with the first UCI.

6. A user equipment, comprising:
   a transceiver configured to:
      receive, by a user equipment (UE) from a base station (BS), a first configuration for a first hybrid automatic repeat request acknowledgement (HARQ-ACK) codebook;
      receive, from the BS, first scheduling information for transmitting a first HARQ-ACK and first uplink control information (UCI) during a time period, wherein the first UCI includes channel state information (CSI) or a scheduling request (SR), wherein the first configuration indicates that a duration associated with the first HARQ-ACK codebook is sub-slot-based, and wherein a second configuration indicates that a duration associated with the first UCI is slot-based; and
      transmit, to the BS, the first HARQ-ACK and the first UCI within a first sub-slot during the time period based on:
         the first scheduling information; and
         the first UCI and the first HARQ-ACK codebook having a common priority; and
   a processor configured to:
      determine that the first UCI and the first HARQ-ACK codebook have the common priority, wherein the first HARQ-ACK is based on the first HARQ-ACK codebook.

7. The UE of claim 6,
   wherein the first configuration indicates that the first HARQ-ACK codebook corresponds to one of a high priority or a low priority.

8. The UE of claim 6, wherein the transceiver is configured to:
   receive, from the BS, first DL data and second DL data;
   receive, from the BS, an indication that feedback for the first and second DL data belongs to the first HARQ-ACK codebook; and
   transmit a first HARQ-ACK bit corresponding to the first DL data and transmit a second HARQ-ACK bit corresponding to the second DL data, wherein the first HARQ-ACK includes the first HARQ-ACK bit and the second HARQ-ACK bit.

9. The UE of claim 6, wherein the first configuration indicates that the first HARQ-ACK codebook corresponds to a first priority;
the transceiver is further configured to:
receive, from the BS, a third configuration for a second HARQ-ACK codebook, wherein the third configuration indicates that a second duration associated with the second HARQ-ACK codebook is slot-based and that the second HARQ-ACK codebook corresponds to a second priority different from the first priority;
receive, from the BS, a first indication that the first UCI corresponds to the first priority and a second indication that second UCI corresponds to the second priority, wherein the second UCI includes second CSI or a second SR;
receive, from the BS, second scheduling information for transmitting a second HARQ-ACK and the second UCI during a second time period; and
transmit, to the BS, the second HARQ-ACK and the second UCI during the second time period based on the second scheduling information, wherein the second HARQ-ACK is based on the second HARQ-ACK codebook.

10. The UE of claim 6, wherein the processor is further configured to:
determine that the first HARQ-ACK collides with the first UCI, and
wherein the transceiver configured to transmit the first HARQ-ACK and the first UCI comprises the transceiver configured to transmit the first HARQ-ACK multiplexed with the first UCI based on the first HARQ-ACK colliding with the first UCI.

11. A non-transitory computer-readable medium having program code recorded thereon, the program code comprising:
code for causing a user equipment (UE) to receive, from a base station (BS), a first configuration for a first hybrid automatic repeat request acknowledgement (HARQ-ACK) codebook;
code for causing the UE to receive from the BS, first scheduling information for transmitting a first HARQ-ACK and first uplink control information (UCI) during a time period, the first UCI including channel state information (CSI) or a scheduling request (SR), wherein the first configuration indicates that a duration associated with the first HARQ-ACK codebook is sub-slot-based, and wherein a second configuration indicates that a duration associated with the first UCI is slot-based;
code for causing the UE to determine that the first UCI and the first HARQ-ACK codebook have a common priority, wherein the first HARQ-ACK is being based on the first HARQ-ACK codebook; and
code for causing the UE to transmit the first HARQ-ACK and the first UCI within a first sub-slot during the time period based on:
the first scheduling information; and
the first UCI and the first HARQ-ACK codebook having the common priority.

12. The non-transitory computer-readable medium of claim 11, further comprising code for causing the UE to determine that the first HARQ-ACK collides with the first UCI, and
wherein the code for causing the UE to transmit the first HARQ-ACK and the first UCI comprises code for causing the UE to transmit the first HARQ-ACK multiplexed with the first UCI based on the first HARQ-ACK colliding with the first UCI.

13. A method of wireless communication, comprising:
transmitting, by a base station (BS) to a user equipment (UE), a first configuration for a first hybrid automatic repeat request acknowledgement (HARQ-ACK) codebook;
transmitting, by the BS to the UE, first scheduling information for transmitting a first HARQ-ACK and first uplink control information (UCI) during a time period, the first UCI including channel state information (CSI) or a scheduling request (SR), and the first HARQ-ACK and the first UCI having a common priority, wherein the first configuration indicates that a duration associated with the first HARQ-ACK codebook is sub-slot-based, and wherein a second configuration indicates that a duration associated with the first UCI is slot-based; and
receiving, by the BS from the UE, the first HARQ-ACK and the first UCI in a first sub-slot based on the first scheduling information and the first HARQ-ACK codebook.

14. The method of claim 13, wherein the first configuration indicates that the first HARQ-ACK codebook corresponds to one of a high priority or a low priority.

15. The method of claim 13, further comprising:
transmitting, by the BS to the UE, first DL data and second DL data; and
transmitting, by the BS to the UE, an indication that feedback for the first and second DL data belongs to the first HARQ-ACK codebook,
wherein receiving the first HARQ-ACK includes receiving a first HARQ-ACK bit corresponding to the first DL data and receiving a second HARQ-ACK bit corresponding to the second DL data.

16. The method of claim 13, comprising:
transmitting, by the BS to the UE, a third configuration for a second HARQ-ACK codebook, the first configuration indicating that the first HARQ-ACK codebook corresponds to a first priority, and the third configuration indicating that a second duration associated with the second HARQ-ACK codebook is slot-based and that the second HARQ-ACK codebook corresponds to a second priority different from the first priority;
transmitting, by the BS to the UE, a first indication that the first UCI corresponds to the first priority and a second indication that second UCI corresponds to the second priority, the second UCI including second CSI or a second SR;
transmitting, by the BS to the UE, second scheduling information for transmitting a second HARQ-ACK and the second UCI during a second time period; and
receiving, by the BS from the UE, the second HARQ-ACK and the second UCI during the second time period based on the second scheduling information, the second HARQ-ACK being based on the second HARQ-ACK codebook.

17. The method of claim 13, wherein the first scheduling information indicates that the first HARQ-ACK collides with the first UCI, and
wherein the receiving the first HARQ-ACK and the first UCI comprises receiving the first HARQ-ACK multiplexed with the first UCI based on the first HARQ-ACK colliding with the first UCI.

18. A base station, comprising:
a transceiver configured to:
- transmit, to a user equipment (UE), a first configuration for a first hybrid automatic repeat request acknowledgement (HARQ-ACK) codebook;
- transmit, to the UE, first scheduling information for transmitting a first HARQ-ACK and first uplink control information (UCI) during a time period, the first UCI including channel state information (CSI) or a scheduling request (SR), and the first HARQ-ACK and the first UCI having a common priority, wherein the first configuration indicates that a duration associated with the first HARQ-ACK codebook is sub-slot-based, and wherein a second configuration indicates that a duration associated with the first UCI is slot-based; and
- receive, from the UE, the first HARQ-ACK and the first UCI in a first sub-slot based on the first scheduling information and the first HARQ-ACK codebook.

19. The base station of claim 18, wherein the first configuration indicates that the first HARQ-ACK codebook corresponds to one of a high priority or a low priority.

20. The base station of claim 18, wherein the transceiver is further configured to:
- transmit, to the UE, first DL data and second DL data;
- transmit, to the UE, an indication that feedback for the first and second DL data belongs to the first HARQ-ACK codebook; and
- receive the first HARQ-ACK by receiving a first HARQ-ACK bit corresponding to the first DL data and receive a second HARQ-ACK bit corresponding to the second DL data.

21. The base station of claim 18, wherein the transceiver is configured to:
- transmit, to the UE, a third configuration for a second HARQ-ACK codebook, the first configuration indicating the first HARQ-ACK codebook corresponds to a first priority, and the third configuration indicating that a second duration associated with the second HARQ-ACK codebook is slot-based and that the second HARQ-ACK codebook corresponds to a second priority different from the first priority;
- transmit, to the UE, a first indication that the first UCI corresponds to the first priority and a second indication that second UCI corresponds to the second priority, the second UCI including second CSI or a second SR;
- transmit, to the UE, second scheduling information for transmitting a second HARQ-ACK and the second UCI during a second time period; and
- receive, from the UE, the second HARQ-ACK and the second UCI during the second time period based on the second scheduling information, the second HARQ-ACK being based on the second HARQ-ACK codebook.

22. The BS of claim 18, wherein the first scheduling information indicates that the first HARQ-ACK collides with the first UCI, and
wherein the transceiver configured to receive the first HARQ-ACK and the first UCI comprises the transceiver configured to receive the first HARQ-ACK multiplexed with the first UCI based on the first HARQ-ACK colliding with the first UCI.

23. A non-transitory computer-readable medium having program code recorded thereon, the program code comprising:
- code for causing a base station (BS) to transmit to a user equipment (UE), a first configuration for a first hybrid automatic repeat request acknowledgement (HARQ-ACK) codebook;
- code for causing the BS to transmit to the UE, first scheduling information for transmitting a HARQ-ACK and first uplink control information (UCI) during a time period, the first UCI including channel state information (CSI) or a scheduling request (SR), and the first HARQ-ACK and the first UCI having a common priority, wherein the first configuration indicates that a duration associated with the first HARQ-ACK codebook is sub-slot-based, and wherein a second configuration indicates that a duration associated with the first UCI is slot-based; and
- code for causing the BS to receive from the UE, the first HARQ-ACK and the first UCI in a first sub-slot based on the first scheduling information and the first HARQ-ACK codebook.

24. The non-transitory computer-readable medium of claim 23, wherein the first scheduling information indicates that the first HARQ-ACK collides with the first UCI, and
wherein the code for causing the BS to receive the first HARQ-ACK and the first UCI comprises code for causing the BS to receive the first HARQ-ACK multiplexed with the first UCI based on the first HARQ-ACK colliding with the first UCI.

* * * * *